United States Patent [19]

Schalch et al.

[11] 4,144,440
[45] Mar. 13, 1979

[54] METHOD AND APPARATUS FOR CONTROLLING WELDING OPERATIONS DURING RESISTANCE WELDING

[75] Inventors: Fred E. Schalch, Le Landeron; Anton Szöky, Colombier, both of Switzerland

[73] Assignee: Fael SA, Saint-Blaise, Switzerland

[21] Appl. No.: 883,168

[22] Filed: Mar. 3, 1978

Related U.S. Application Data

[63] Continuation-in-part of Ser. No. 588,473, Jun. 19, 1975, abandoned.

[30] Foreign Application Priority Data

Jun. 21, 1974 [CH] Switzerland .................... 8510/74

[51] Int. Cl.² ............... B23K 11/06; B23K 11/24
[52] U.S. Cl. ............................ 219/61.5; 219/64; 219/81; 219/87; 219/91.1; 219/111
[58] Field of Search ............ 219/59, 61.5, 64, 108, 219/110, 114, 91.1, 81, 87, 111

[56] References Cited

U.S. PATENT DOCUMENTS

| | | | |
|---|---|---|---|
| 1,933,045 | 10/1933 | Caputo | 219/61.5 |
| 1,996,902 | 4/1935 | Caputo | 219/108 |
| 2,052,965 | 8/1936 | Caputo | 219/108 |
| 2,235,392 | 3/1941 | Wright | 219/61.5 |
| 2,264,175 | 11/1941 | Dawson | 219/114 |
| 3,584,178 | 6/1971 | Huber et al. | 219/64 |
| 3,632,949 | 1/1972 | Thorne | 219/108 |

*Primary Examiner*—J. V. Truhe
*Assistant Examiner*—Clifford C. Shaw
*Attorney, Agent, or Firm*—Charles E. Brown

[57] ABSTRACT

A method of, and apparatus for, respectively controlling the start of welding and the termination of welding during continuous resistance welding with the aid of an alternating-current at a roll-welding machine, wherein at least at one measuring station or location arranged ahead or upstream of the welding station or location and the workpiece to be welded passing through the measuring station there is determined the position as a function of time of the leading end as well as the trailing end of the workpiece to be welded with respect to the frequency and the phase of the welding current. By means of a computer processing the determined value there is accommodated to one another the speed of the workpiece to be welded and the frequency and phase of the welding current in such a manner that the first welding spot and the last welding spot are applied at an adjustable spacing from the leading end and the trailing end, respectively, of the workpiece to be welded.

32 Claims, 8 Drawing Figures

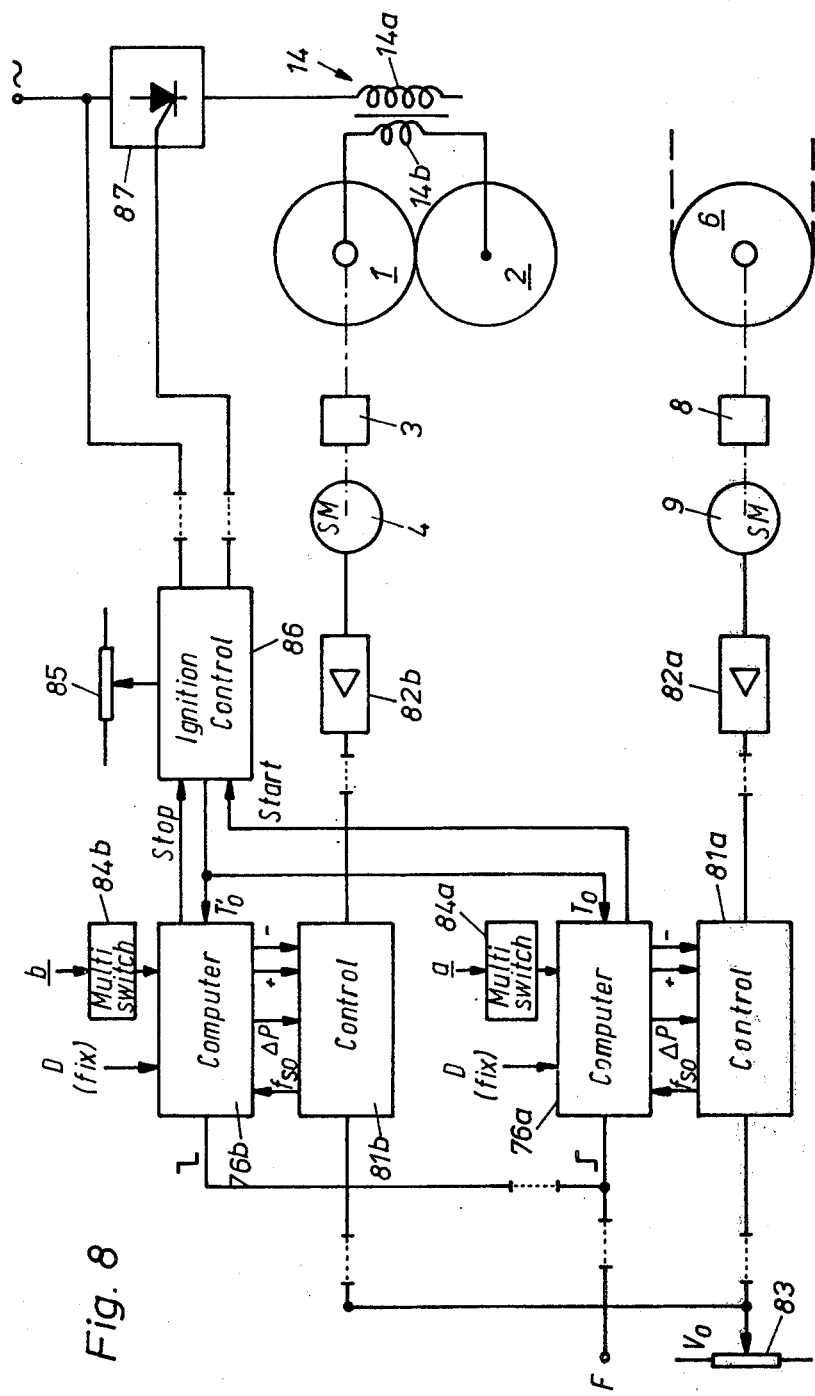

but also an apparatus for the performance thereof, so that a further aspect of the invention relates to an apparatus for controlling the welding operation during continuous resistance welding by means of alternating-current at a roll-welding machine.

METHOD AND APPARATUS FOR CONTROLLING WELDING OPERATIONS DURING RESISTANCE WELDING

CROSS REFERENCE TO RELATED CASE

This case is a continuation-in-part of our commonly assigned, copending U.S. application Ser. No. 588,473, filed June 19, 1975, now abandoned.

BACKGROUND OF THE INVENTION

The present invention broadly relates to the art of feed controls, particularly for welding operations, and more specifically concerns a new and improved method of, and apparatus for, controlling the start of the welding operation and the completion of the welding operation during continuous resistance welding. The resistance welding can be accomplished by means of alternating current at a roll-welding machine.

During the fabrication of barrels or other containers, for instance tin plate cans comprising a substantially cylindrical shell or jacket and a folded-in floor or bottom the heretofore known state-of-the-art processes advantageously relied upon the so-called resistance roll seam welding for realizing a leak-tight seam. Resistance roll seam welding is characterized as overlap welding of a sequence of spot welds, and during each half-wave of the alternating-current employed for this purpose there is applied a weld spot. This weld spot, considered with respect to the direction of transport or feed of the workpiece to be welded, has a predetermined length dimension which results from the speed of the transport mechanism of the roll-welding machine for a predetermined frequency of the alternating-current, and related to practical considerations, amounts to approximately 2.5 millimeters with a transport speed or velocity of 15m/min. and an alternating-current of 50 Hz. The weld spots of the aforementioned length then are located on a line next to one another along the overlapping edges of the workpiece to be welded.

With the present day conventional welding techniques it is, however, unavoidable that at the start of the weld seam and/or at the end of the weld seam a weld spot appears exactly at the workpiece edge, resulting in only a portion of such weld spot being located at the workpiece to be welded, which, in turn, causes a burning or scorching of such edge. If the workpiece to be welded is for instance a rounded blank which forms the body of a can which is to be fabricated in this manner, and which body is subsequently provided with an end unit by carrying out a seaming operation, then the drawbacks of the scorched edges become particularly perceivable during the seam of such end unit since leakage locations appear in the seam.

SUMMARY OF THE INVENTION

Hence, it is a primary object of the present invention to provide a new and improved method of, and apparatus for, controlling the welding operations during resistance welding in a manner not associated with the aforementioned drawbacks and limitations of the prior art proposals.

Another and more specific object of the present invention resides in the provision of a novel method of, and apparatus for, avoiding the application of a weld spot to the edge of the front or rear end of a workpiece passing through a roll-welding machine.

In keeping with the immediately preceding object it is a further objective of the invention of properly coordinating the frequency of the welding current and the transport or feed speed of the workpeice to one another in order to realize proper application of the weld spots to a workpiece.

Now in order to implement these and still further objects of the invention, which will become more readily apparent as the description proceeds, the method of this development for controlling the start of the welding operation and the end or termination of the welding operation during continuous resistance welding by means of an alternating-current at a roll-welding machine, is manifested by the features that at least at one measuring station or location which is arranged upstream or ahead of the welding station or location and through which passes the workpiece to be welded there is determined the position as a function of time of the leading end and the trailing end of the workpiece to be welded with respect to the frequency and phase of the welding current, and by means of a computer processing the determined value there is matched or coordinated to one another the speed of movement of the workpiece to be welded and the frequency and phase of the welding current in such a manner that the first weld spot and the last weld spot in each instance come to lie at an adjustable spacing from the leading and trailing end, respectively, of the workpiece to be welded.

In practicing the invention it is advantageous to use a welding current having a constant frequency, requiring accommodation of the speed of travel of the workpiece, and specifically advantageously in a manner that the speed of a drive motor of a transport mechanism infeeding the workpiece to the welding rollers or electrode rolls is regulated by means of a computer in such a manner that the first weld spot in each instance comes to lie at an adjustable spacing from the leading end of the workpiece, and furthermore, the speed of the drive motor or the welding roll is regulated by the computer in such a manner that the last welding spot in each instance comes to lie at an adjustable spacing from the trailing end of the workpiece. The workpiece to be welded is thus transferred by the transport mechanism to the welding rollers which then perform the further transport of the workpiece. In consideration of attaining the proper position of the first welding spot it is necessary to regulate the speed of the transport or feed mechanism and in consideration of the last welding spot there must be regulated the speed of the welding rollers or rolls. This requires that the welding rollers and the transport mechanism are driven independently of one another.

In order that the workpieces which continuously successively travel through the entire installation trail one another at as short as possible and proper spacing from one another, a further aspect of the method of this invention advantageously contemplates determining at a second measuring station or location located in front of the first measuring station or location the spacing of the workpieces delivered in succession to the welding station or location, with a view of, following transfer of the workpiece from the transport mechanism to the welding rolls, regulating the speed of the drive motor of the transport mechanism by means of the computer in such a way that the spacing with respect to the next following workpiece can be reduced to a minimum.

As already indicated above, the invention is not only concerned with the aforementioned method aspects, but also relates to new and improved apparatus for the performance thereof. Such apparatus comprises means which determines at a measuring station or location arranged ahead of the welding station and through which passes the workpiece to be welded the position as a function of time of the leading end as well as the trailing end of the workpiece to be welded with respect to the frequency and phase of the welding current. Furthermore, there is provided a computer by means of which there can be coordinated the speed of travel of the workpiece to be welded and the frequency and phase of the welding current in consideration of the correct position of the first weld spot and the last weld spot.

There is advantageously employed in practice a welding current possessing constant frequency: The thus required equipment for controlling the workpiece-feed of a roll-welding machine advantageously possesses a transport mechanism which can be driven independently of the welding rolls for the infeed or advance of the workpiece to be welded to the welding rolls by means of conveyor elements which, until such time as the workpiece is transferred to the welding rolls, are in operable engagement with the workpiece. Further, the means for detecting the position as a function of time of the leading end as well as the trailing end of the workpiece with respect to the frequency and phase of the welding current preferably is arranged between the conveying end or terminal point of the transport mechanism and the welding rolls and is operatively connected with the computer — the computer again being operatively connected with the drive motor of the transport mechanism — in order to regulate the speed thereof in such a manner that the first weld spot always is applied at an adjustable spacing from the leading end of the workpiece. The computer furthermore is operatively connected with the drive motor of one of the welding rolls in order to regulate the speed thereof in such a manner that the last weld spot in each instance is applied at an adjustable spacing or distance from the trailing end of the workpiece.

The term computer as employed herein is intended to mean a device with which there can be associated the different elements for carrying out the function of the computer and which are connected between the individual measuring stations or locations and the drive motors of the transport mechanism and the welding rolls and which elements are functionally interconnected into a unit or assembly.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a block circuit diagram of the entire feed control together with the circuitry of FIG. 7.

DETAILED DESCRIPTION OF THE PREFERRED EMBODIMENTS

Figure 1:
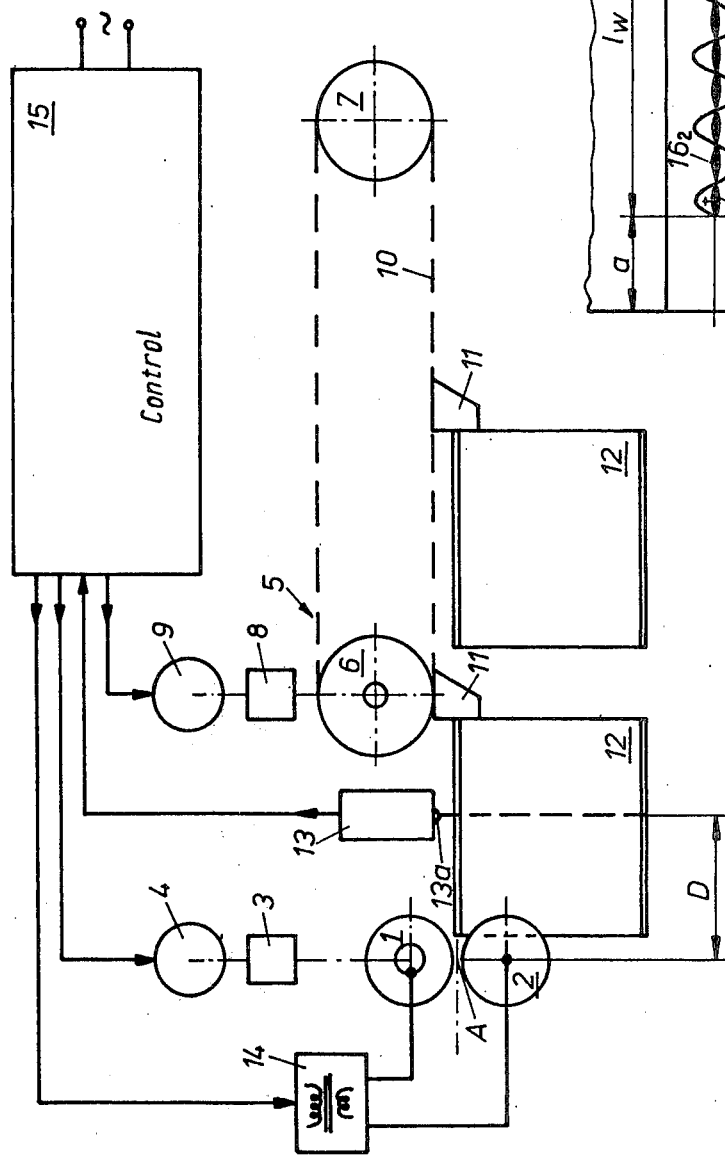
FIG. 1 is a block circuit diagram of a roll-welding machine and the associated control elements.

Describing now the drawings, the schematically illustrated roll-welding machine of FIG. 1 will be seen to comprise a pair of welding rollers or rolls 1 and 2 — also sometimes referred to in the art as electrode rolls — wherein, in the embodiment under discussion the welding roll 1 is driven by a suitable drive motor 4 through the intermediary of the gearing or transmission means 3. A transport or feed mechanism 5 arranged in spaced relationship from the welding rolls 1 and 2 embodies two sprocket wheels or gears 6 and 7, wherein the one sprocket wheel 6 is driven by means of the gearing 8 from a drive motor 9. A conveyor or feed chain 10 or equivalent structure, which is trained over both of the sprocket wheels or gears 6 and 7, supports at spaced locations along such sprocket chain 10 conveying or feed elements 11 which continuously transport or feed the workpieces or blanks 12 in a predetermined direction of travel to the welding rolls 1 and 2. The blanks or workpieces 12 which are to be welded are assumed, by way of example, to be constituted by sheet-metal strip stock, the overlapping contacting edges of which are to be joined together by a roll seam welding operation, in order to thereby obtain a leakage-tight seam. Each welded together sheet-metal strip forms the body of a can, by way of example, and by performing a suitable seaming operation during a subsequent working step there can be attached an end unit of the can.

Between the pair of welding rolls 1 and 2 and the sprocket wheel 6 of the transport or feed mechanism 5 there is arranged an electrical detector device or detector means 13, namely an edge detector, which, for instance, comprises a conventional light barrier or photoelectric cell arrangement. The detector device 13 delivers an electrical signal when a blank 12 passes its detector element 13a, which, for instance, transmits a light beam. A measuring path D is defined between the detector element 13a and the welding location A of the pair of welding rolls 1 and 2, this measuring path D having a predetermined length $1_D$. Connected with the welding rolls 1 and 2 is a conventional welding transformer 14 which is phase controlled. All of these circuits for operating the welding transformer 14 and the drive motors 4 and 9 have been grouped together in the showing of FIG. 1 into a control device 15 shown in a block, but will be considered in greater detail hereinafter in conjunction with the other Figures of the drawing. At the input side of the control device 15 there is connected the power supply network and the detector device 13 and at the output side thereof there is connected the welding transformer 14 and the drive motors 4 and 9.

The drive motors 4 and 9 for driving the welding roll 1 and the sprocket wheel or gear 6 are motors having digitalized drive, for instance standard stepping motors. Although not absolutely necessary, nonetheless it is still advantageous to employ stepping motors 4 and 9 which have the same number of steps per revolution, and to design the gearing 3 and 8 such that the individual blanks 12 during normal operation are advanced by the conveying or feed chain 10 and after moving into the space between the pair of welding rolls 1 and 2 are fed by the welding roll 1, during each step of the stepping motors 4 and 9, through the same displacement path increment Δs. The drive pulses for the welding roll-drive motor 4 and for the sprocket wheel-drive motor 9 then have the same frequency, to wit: $f_S = f_K$.

Figure 2:
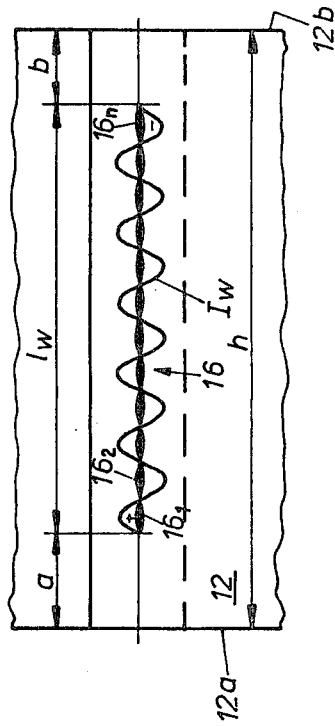
FIG. 2 is a schematic plan view on an enlarged scale and illustrates the principle of the roll seam welding at a section of a workpiece.

FIG. 2 schematically shows the welding seam region of a blank or workpiece 12. The welding seam 16 consists of a series of successive welding spots or points $16_1$, $16_2$, ... $16_n$, each of which is produced by a half-wave of the welding alternating-current $I_W$. The welding current $I_W$ is received from the not particularly referenced power supply network schematically indicated in the upper right-hand portion of FIG. 1 and the welding current frequency $f_{IW}$ is therefore equal to the network frequency.

Because of the requisite magnetic reversal of the welding transformer 14 each of the successively welded welding seams 16 must start with a first welding spot $16_1$ produced by a half-wave of predetermined polarity (positive or negative) and must terminate at a last welding spot $16_n$ produced by a half-wave of opposite polarity (negative or positive). Each welding seam 16 thus encompasses a number of pairs of welding spots, and each pair of welding spots is produced by a complete wave of the welding current $I_W$. The welding seam 16 starts at a spacing a, the front spacing, from the leading blank edge 12a and terminates at a spacing b, the end or terminal spacing, from the trailing blank edge 12b. The length of the welding seam 16 has been designated by the symbol $l_W$ and the height of the blank by reference character h.

Figure 3:
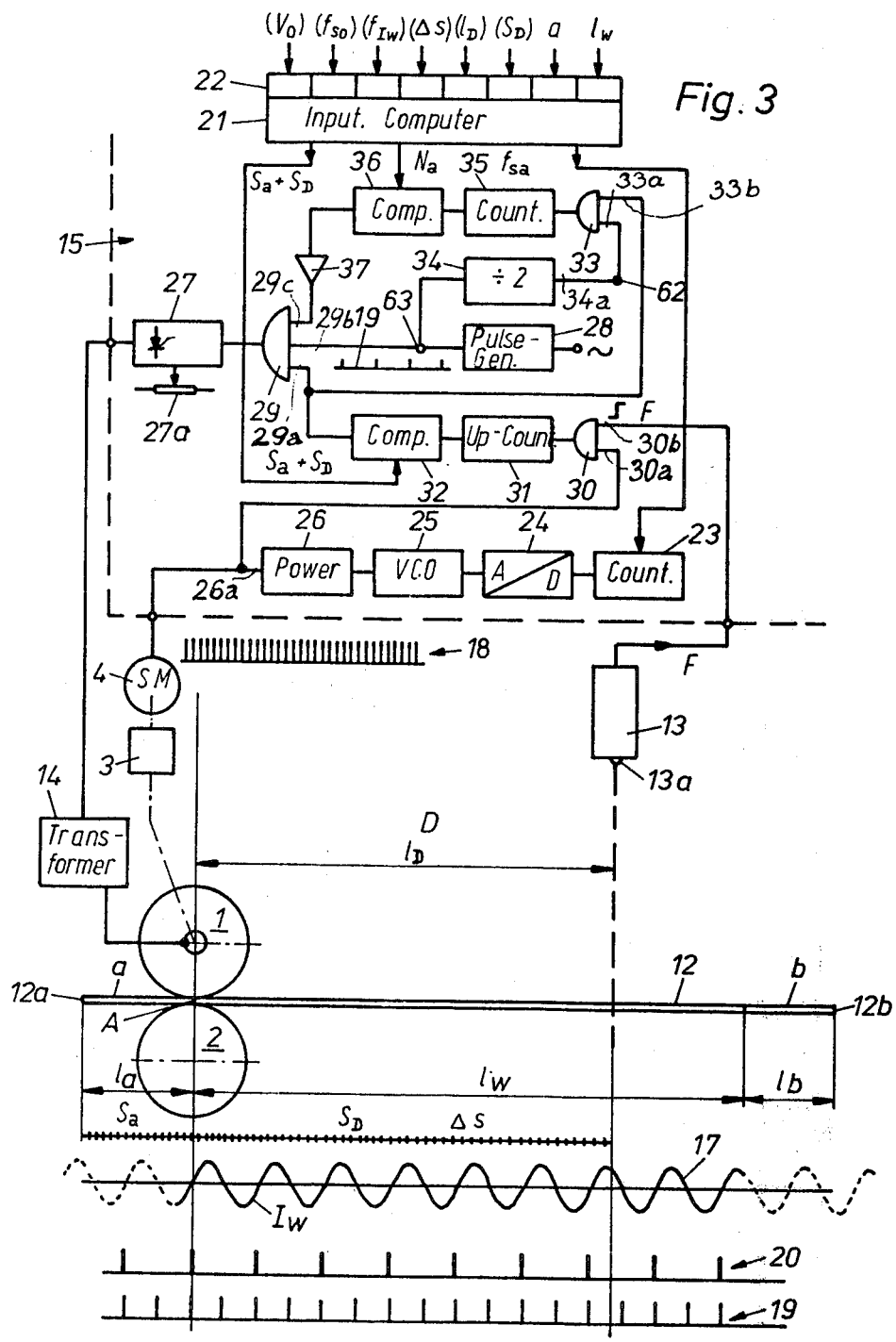
FIG. 3 a block circuit diagram and schematically illustrates details of the roll-welding machine of FIG. 1 and the circuitry of the control.

Attention is now directed to FIG. 3 schematically showing in greater detail the welding rolls 1 and 2 together with the welding roll-drive motor 4, the measuring or measurement path D and a blank 12 introduced between the welding rolls 1 and 2. There is shown the start of the formation of a welding seam, i.e., the situation at that point in time when the leading edge 12a of the blank 12 introduced between the welding rolls 1 and 2 just is at the distance or spacing a from the welding location or station A and the welding current $I_W$, shown as a sinusoidal wave 17, has a positive null throughpass, so that the next following positive half-wave of the welding current $I_W$ produces the first welding spot.

With each step of the welding roll-drive motor 4 and the sprocket wheel-drive motor 9, respectively, the blank 12 is advanced through the displacement path increment Δs, and the drive means (motor, gearing, diameter of the welding roll and the sprocket wheel 6) are selected such that the displacement path increment Δs only equals a small length $l_{\Delta s}$ of, for instance, 0.01 cm. The measuring path D extending from the welding location A between the welding rolls 1 and 2 up to the detector element 13a (light beam) has a predetermined length $l_D$, preferably amounting to a whole number $S_D$ of displacement path increments Δs, and specifically for instance amounting to several hundred path increments Δs. The length of the measuring or measurement path D can be adjustable. Since with each step of the respective drive motors 4 and 9 the blank 12 is forwardly fed or advanced by one displacement path increment Δs and each such drive motor is rotated through one step by a drive pulse, it is possible to express all lengths by numerical values of the drive pulses. The following equations hold true:

The measuring path D equals the pulse count $S_D =$
$$l_D/\Delta s \qquad (1)$$

The front spacing a equals the pulse count $S_a = a/\Delta s \qquad (2)$

The welding seam 16 equals the pulse count $S_W =$
$$l_W/\Delta s \qquad (3)$$

The end spacing b equals the pulse count $S_b = b/\Delta s \qquad (4)$

For the normal operation there can be predetermined a given constant blank feed velocity, hereinafter referred to as the rated-feed velocity or speed $V_o$. From this predetermined rated-feed velocity $V_o$ (in cm/sec) and the predetermined displacement path increment Δs (in cm) there can be derived the rated-drive pulse frequency $f_{So}$ (in Hz) for the welding roll-drive motor 4 and the rated-drive pulse frequency $f_{Ko}$ (in Hz) for the sprocket wheel-drive motor 9. Such can be expressed by the following equation:

Rated pulse frequency $f_{So} = f_{Ko} = V_o/\Delta s \qquad (5)$

Thus, from this rated-pulse frequency $f_{So} = f_{Ko}$ there can be derived for a full cycle of the welding current $I_W$ (welding current frequency $f_{IW}$), and thus, for a full wave of the welding current as well as for the length $l_{Wp}$ of a pair of welding spots the so-called "cycle"-pulse count, which can be expressed by the following equation:

"Cycle"-pulse count $S_{\lambda o} = f_{So}/f_{IW} \qquad (6)$

Now in FIG. 3 there is schematically illustrated a pulse train 18 for the drive pulses of the rated-pulse frequency $f_{So}$ and a reference-pulse train 20 which is derived from the welding current $I_W$. This reference pulse train 20 encompasses, for instance, a needle or spike pulse for each positive null through-pass of the welding current $I_W$. Each full wave of the welding current $I_W$, determined by two successive pulses of the reference-pulse train 20, encompasses a predetermined number of drive pulses 18 (cycle-pulse count $S_\lambda$), and it will be apparent that by counting the drive pulses 18, starting with a reference pulse 20, it is possible to detect the phase of the welding current $I_W$.

It is here initially assumed that by means of the welding machine there are welded a large number of the same blanks 12 with welding seams of the same length $l_W$ and the same front spacing a and rear or end spacing b. This allows for a relatively simple construction of the feed control, since, as will be demonstrated through the disclosure to follow, in order to produce faultless welds it is only necessary to control the sprocket wheel-drive motor 9, and the welding roll-drive motor 4 however can be operated with drive pulses of constant pulse frequency.

What is required is that the welding seam 16 (FIG. 2) encompass an entire number of welding spot-pairs, i.e., a number of full waves of the welding current $I_W$. With the contemplated rated-feed velocity $V_o$ and thus the rated-pulse frequency $f_{So}$ (Equation 5) provided for the welding roll-drive motor 4 this requirement is generally not fulfilled. With the rated-pulse frequency $f_{So}$ the welding seam contains the stepping or pulse count $S_{Wo}$ = $l_W \cdot f_{So}/V_o$ (Equations 3 and 5) and such welding seam-pulse count $S_{Wo}$ encompasses a number $N_o$ of complete cycles of the welding current $I_W$ (cycle-pulse number or count, Equation 6) and a fraction $R_W$ of a welding current cycle. This can be expressed by the following Equation.

$$S_{Wo} = N_o \cdot S_{\lambda o} + R_W \tag{7}$$

wherein, $N_o$ amounts to a whole integer and $0 < R_W < S_{\lambda o}$.

In order that there is fulfilled the previously mentioned requirement for a whole number of pairs of welding spots at the welding seam, there is valid for the contemplated welding seam length $l_W$ the relationship $N_a = N_o$ or $N_a = N_o + 1$ pairs of welding spots, i.e., the remainder $R_W$ in the above Equation (7) disappears, and while utilizing this new value $N_a$ for the number of pairs of welding spots (cycles or full waves of the welding current $I_W$) at the welding seam length $l_W$ there is calculated for the drive of the welding roll-motor 4 a "corrected" drive pulse frequency $f_{Sa}$. Thus, for instance, in accordance with Equation (5) the work pulse frequency can be expressed as $f_{Sa} = V_a/\Delta s$, wherein $V_a$ equals the work-feed velocity, and, on the other hand, the work-feed velocity $V_a$ is determined by the cylce length $l_W/N_a$ and the welding current frequency $f_{IW}$, i.e., $V_a = l_W \cdot f_{IW}/N_a$. Hence, there is valid the following Equation for the work-pulse frequency $f_{Sa}$:

Work-pulse frequency $f_{Sa} = l_W \cdot f_{IW}/N_a \cdot \Delta s \tag{8}$ wherein, $\Delta s$ is predetermined by the drive mechanism (Equation 1).

In this simple exemplary embodiment the control device 15 (FIG. 1) for the drive of the welding roll motor 4 contains, for instance, a computer 21. This computer 21 is designed for calculating the work-pulse frequency $f_{Sa}$ from the values for the rated-pulse frequency $f_{So}$, the welding seam length $l_W = h - a - b$, the rated-feed velocity $V_o$, the welding current frequency $f_{IW}$ and the discplacement path increment $\Delta s = l_D/S_D$. These values are introduced by means of a multi-position switch or multi-switch arrangement 22. The computer 21 sets a counter 23 to the computed value for the work-pulse frequency $f_{Sa}$. Connected with the counter 23 is a digital-analog converter (D/A-converter) 24 and with such there is connected a voltage controlled oscillator (VCO) 25. The output pulses of the VCO 25 are applied by means of a power circuit or component 26 to the welding roll-drive motor 4 which, therefore, is operated at the constant work-pulse frequency $f_{Sa}$. The setting to a work-pulse frequency $f_{Sa}$ allows for an extremely simple control for welding the individual welding seams.

The welding transformer 14 (FIG. 1) is connected at its primary side with a conventional phase control circuit 27 (FIG. 3) containing thyristors and a potentiometer 27a for adjusting the desired welding power. The phase control circuit 27 receives a welding signal 19 derived from the welding current $I_W$, and which for each null throughpass of the welding current $I_W$ possesses for instance a needle or spike pulse. The phase control circuit 27 embodies a gate circuit which in response to a welding-start signal and a welding-stop signal permits the welding signal 19 to become effective for producing in each case a welding seam, so that with each pulse of the effective welding signal 19 there is deposited a weld spot. To produce this welding signal 19 at the frequency $2f_{IW}$ from the welding current $I_W$ there is employed a conventional pulse transmitter 28 (FIG. 3). This welding signal 19 is delivered to the phase control circuit 27 for instance by means of an AND-gate 29 having three inputs 29a, 29b and 29c.

When the blank 12 has been forwardly advanced by the conveyor or feed chain 10 (FIG. 1) to such an extent that the leading edge 12a arrives at the operable region of the feeler element 13a (light beam), then the edge detector 13 delivers a trigger signal F for the control. The trigger signal F can be, for instance, a positive going pulse flank. After the presence of the trigger signal F the blank 12 must be moved through $(S_a + S_D)$ steps (drive pulses 18) until depositing the first weld spot. After counting such $(S_a + S_D)$ drive pulses 18 there is thus effective the welding signal 19 for the phase control circuit 27. The welding signal 19 then remains effective for $N_a$ pulses of the reference-pulse train 20 (or $2N_a$ pulses of the welding signal or $N_a \cdot S_{Pa}$ drive pulses 18), and there are deposited $N_a$ weld spot-pairs. In this manner, after having once carried out the initial setting to the relevant type of blank, there are obtained welding seams of exactly the same length, along which there are uniformly distributed the weld spots and all of which start at the set spacing a from the leading blank edge 12a and terminate at the spacing b from the trailing blank edge 12b. The welding control can be carried out with a simple counter circuit.

With the counter circuit shown by way of example in FIG. 3 there is connected to the one input 29b of the AND-gate or circuit 29 the pulse transmitter 28 which produces the welding signal 19. At another input 29a of such AND-gate 29 there is connected a digital comparator 32 which is set by the computer 21 to the counter value $(S_a + S_D)$, an upward counter 31 and an AND-gate or circuit 30. The AND-gate 30 receives at its one input 30a the drive pulses 18 which are delivered for instance by the output 26a of the power circuit 26 and at its other input 30b receives the trigger signal F of the edge detector 13. When the counter 31 has reached the set counter value $(S_a + S_D)$ then the digital comparator 32 delivers a welding-start signal (logic signal 1). At the third input 29c of the AND-gate 29 there is connected a similar circuit arrangement embodying a digital comparator 36 set by the computer 21 to, for instance, the counter value $N_a$, a counter 35 and an AND-gate or circuit 33. The one input 33a of the AND-gate 33 receives the pulses of the welding signal 19 from the pulse generator 28 by means of a frequency divider 34 serving to produce the reference signal 20 from the welding signal 19, and the other input 33b receives the output signal of the digital comparator 32. As long as the counter state of the counter 35 is lower than the set counter value $N_a$ the digital comparator 36 delivers a null signal. This has been indicated in FIG. 3 by an additional inverter 37. When the counter 35 has reached the counter state or value $N_a$ then the digital comparator 36 changes its output signal from logic 1 to logic 0 and such corresponds to the welding-stop signal.

The counter circuit of course can be differently constructed. The constant values for, for instance, $V_o$, $f_{So}$, $f_{IW}$, and so forth, can be stored in the computer 21, so that there need only be set by means of the multi-position switch or multi-switch arrangement 22 the values, for instance, for a and $l_W$. It is then possible to dispense with the computer 21. The digital comparators 32 and 36 as well as the counter 23 are then manually set to the computed values $(S_a + S_D)$, $N_a$ and $f_{Sa}$.

The setting of the first weld spot, as mentioned, should begin during a null throughpass of the welding current $I_W$. With the predetermined front spacing a, predetermined length $l_D$ of the measuring path D and predetermined constant drive-pulse frequency $f_{Sa}$, it is therefore necessary for the welding current $I_W$ to have a certain phase at the moment of occurrence of the trigger signal F. This will only be coincidentally the case, and generally the phase of the welding current $I_W$ at the moment of the occurrence of the trigger signal F will have a different value. The blank or workpiece 12 must be introduced into the pair of welding rolls 1 and 2 with the work-feed velocity $V_a$ (drive-pulse frequency $f_{Sa}$) and in order to insure that the welding begins exactly during a null throughpass of the welding current $I_W$, the blank 12 during its path of travel from the feeler element 13a of the edge detector 13 to the welding rolls 1 and 2 will be accelerated (or decelerated), in accordance with the phase error, first from the work-feed velocity $V_a$ to a higher (or lower) value $V_1$ and then again decelerated (or accelerated) from this value $V_1$ to the work-feed velocity $V_a$.

As already mentioned, the displacement path D + a (measuring path + front spacing) $(S_a+S_D)$ through which the blank 12 moves upon appearance of the trigger signal F until start of the welding operation and each complete cycle (full wave) of the welding current $I_W$ at the work-feed velocity (drive-pulse frequency $f_{Sa}$) encompasses $S_{\lambda a}$ displacement path increments $\Delta s$. If at the moment of appearance of the trigger signal F the welding current $I_W$ has the phase null, then at the start of welding it will have the phase $S_{PP}$ which can be calculated from the following Equation:

$$(S_a + S_D) = N_P(\text{whole}) \cdot S_{\lambda a} + S_{PP} \qquad (9)$$

wherein, $0 < S_{PP} < S_{\lambda a}$.

This phase $S_{PP}$ is designated hereinafter as the "position error".

Upon occurrence of the trigger signal F the welding current $I_W$ has the phase $S_{PF}$, referred to hereinafter as "phase error". It can be determined in that, for instance, starting with each pulse of the reference signal 20 (FIG. 3) the drive pulses (frequency $f_{Sa}$) are upwardly counted from null and the counting operation is interrupted upon the appearance of the trigger signal F.

If the blank 12 is moved with a constant work-feed velocity $V_a$ (drive-pulse frequency $f_{Sa}$), then the welding current $I_W$ at the start of welding, has the phase $S_{PT}$ which can be derived from Equation (9) and $S_{PF}$. This phase $S_{PT}$ will be referred to hereinafter as "total error" and can be directly derived for instance from the following Equation:

$$(S_a + S_D) + S_{PF} = N'_{P(\text{whole})} \cdot S_{\lambda a} + S_{PT} \qquad (10)$$

The manner in which the total error is corrected essentially depends upon whether each first weld spot should be produced by a positive or a negative half-wave (predetermined polarity), or whether the first weld spot can be produced by a positive or negative half-wave (free polarity) and whether the correction should be undertaken only by an acceleration with subsequent deceleration or vice versa, or, however, as a function of the magnitude of the total error beginning with a deceleration or an acceleration, respectively. The latter together with a random polarity of the welding current half-wave for the first weld spot produces the smallest time requirement for the welding of a seam. In this case, for changing the feed velocity there must be derived from the total error a "value signal" $\Delta P$, constituting a correction value, (e.g. $\Delta P = S_{PT}$ when $S_{PT} < S_{\lambda a/2}$ and $\Delta P = S_{\lambda a} - S_{PT}$, when $S_{PT} > S_{\lambda a/2}$) and a "directional signal" for deciding whether to accelerate or decelerate.

Figure 4:
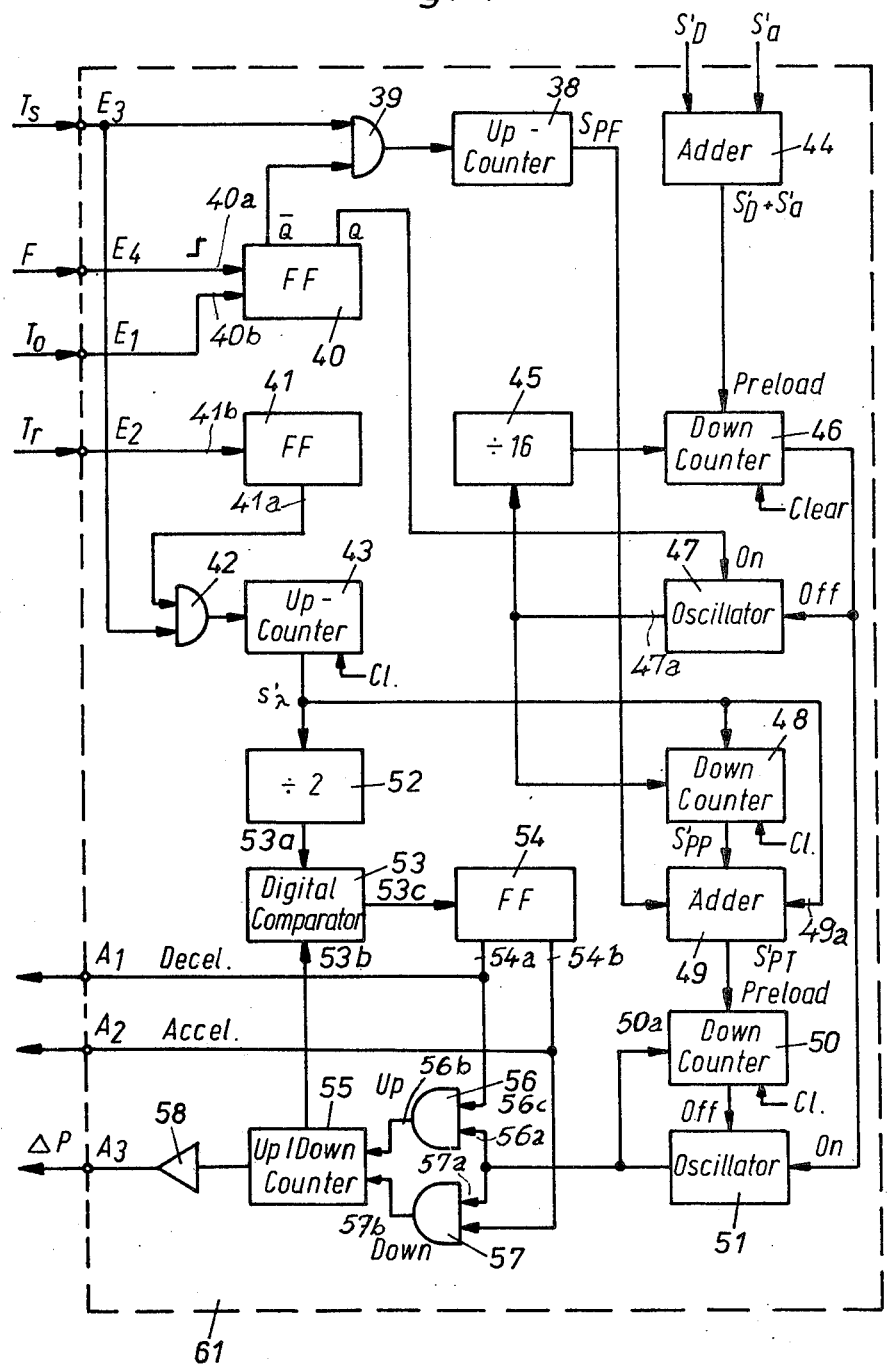
FIG. 4 is a block circuit diagram of a so-called correction circuit arrangement.

FIG. 4 shows a block circuit diagram for such "correction"-circuit arrangement, which will be initially described independent of the previously discussed welding control, in other words with reference to the rated values and not to the work values, and in which for obtaining a higher accuracy there is employed a stepping-clock signal $T_S$, the frequency $f_{TS}$ amounts to a multiple, for instance sixteen times, the drive-pulse frequency $f_{So}$.

The determination of the phase error $S'_{PF}$ as a numerical value of pulses of the stepping-clock signal $T_S$ ($S'_{PF}$: for distinguishing the phase error $S_{PF}$, which constitutes a count of drive pulses or steps) is accomplished by means of a first upward or up counter 38 at which there is applied the stepping-clock signal $T_S$ by means of an AND-gate 39. This AND-gate or circuit 39 is controlled by the Q-output of a flip-flop 40. The one input 40a of the flip-flop 40 receives the trigger signal F from the edge detector 13 (FIG. 3) and its other input 40b receives a null-clock sign $T_O$ for instance in the form of a needle pulse for each null throughpass of the welding current $I_W$. (The null-clock signal $T_O$ corresponds to the wave shape 19 of FIG. 3). Due to the foregoing, the counter 38, before the blank 12 has reached the edge detector 13, counts upwardly from null with each pulse of the null-clock signal $T_O$ and when there appears the trigger signal F (the AND-gate 39 is blocked) stops at the counter value representative of the phase error $S'_{PF}$.

In order to determine the "cycle"-pulse count $S'_\lambda$ in pulses of the stepping-clock signal $T_S$ the circuit arrangement contains a second upwards counter 43 to which there is applied by means of the AND-circuit or gate 42 the stepping-clock signal $T_S$. The AND-gate 42 is controlled by the output 41a of a flip-flop 41, at the input 41b of which there is applied a cycle-clock signal $T_R$ having one-half of the frequency of the null-clock signal $T_O$, and corresponding to the reference signal 20 of FIG. 3. Starting with each pulse of the cycle-clock signal $T_R$ the counter 43 begins to count from null upwards and the obtained end count value constitutes the "cycle"-pulse count $S'_\lambda$.

To determine the position error $S'_{PP}$ (Equation 9) the circuit arrangement contains a first downward or down counter 46, which, for instance, is set by the adder circuit or adder 44 or by the computer 21 (FIG. 3) to the count values $(S_D + S_a)$. The adder 44 has multi-position switch-inputs for the infeed of the measuring path-pulse count $S_D$ and the front spacing-pulse count $S_a$. Further, this circuitry will be seen to possess a second down or downward counter 48 which can be set by the counter 43 to the cycle-pulse count $S'_\lambda$, and an oscillator 47 which is energized by the trigger signal F from the Q-output of the flip-flop 40 and produces a count-clock signal of considerably greater frequency than the stepping-clock signal. This oscillator 47 is turned-off when the first down counting counter 46 has counted to null. The output 47a of the oscillator 47 is connected both by means of a frequency divider 45 (scaling factor = 16) with the first down counter 46 and also directly with the second down counter 48. As soon as the trigger signal F appears then the oscillator 47 delivers counting-clock pulses and the first down counter 46 continuously down counts steps of $(S_D+S_a)$, whereas the second down counter 48 counts successive cycle-pulse counts $S'_\lambda$. When the first counter 46 reaches the counter state null then the oscillator 47 turns-off and the count or numerical value contained in the second counter 48 constitutes the position error $S'_{PP}$, which indicates how many pulses of the stepping-clock signal $T_S$ are still missing until reaching the full cycle-count value $S'_\lambda$ (null throughpass).

The phase error-counter 38 and the position error-counter 48 are connected with an adder or adder circuit 49. The adder 49 determines from the count values $S'_{PF}$ for the phase error and from $S'_{PP}$ for the position error the total error $S'_{PT}$. This can be expressed as follows:

$$S'_{PT} = S'_{PP} - S'_{PF}, \text{ for } S'_{PP} > S'_{PF} \quad (11)$$

$$S'_{PT} = S'_\lambda + S'_{PP} - S'_{PF}, \text{ for } S'_{PP} < S'_{PF}. \quad (12)$$

This has been indicated in FIG. 4 by an additional input 49a of the adder 49 which is connected with the up counter 43. The adder 49 sets a third down counter 50 to the total error $S'_{PT}$.

A second oscillator 51 is energized by the first downward counting counter 46 when this down counter 46 has counted to the value null. This second oscillator 51, just as was the case for the first oscillator 47, produces a count-clock signal which is applied to a respective input 56a and 57a of two AND-gates 56 and 57 and also to the third down counter 50 at its input 50a. When the counter 50 has counted down to null, then the oscillator 51 is turned-off. The outputs 56b and 57b of both of the AND-gates 56 and 57, respectively, are connected with an up/down-counter 55. A digital comparator 53 is set by means of the second up counter 43 (count value $S'_\lambda$), by means of a frequency divider 52 having a scaler factor "2", to the count value corresponding to the half wave-pulse count $S'_{\lambda/2}$. The digital comparator 53 compares this count value $S'_{\lambda/2}$ with the counter state of the up/down-counter 55 and controls a flip-flop 54. The output 54a of the flip-flop 54 is connected with the second input 56c of the AND-gate 56 and also is connected with an output terminal $A_1$, as shown in FIG. 4, and furthermore its other output 54b is connected with a second input 57c of the other AND-gate 57 as well as with a second output terminal $A_2$. If the up/down-counter 55 has a counter state of null then by means of the digital comparator 53 the flip-flop 54 is set, for instance, such that by means of its Q-output the AND-gate 56 is gated. The output connection or terminal $A_1$ then carries a signal which is representative of a "direction signal" e.g. "deceleration". The AND-gate 57 is then blocked by means of the $\overline{Q}$-output of the flip-flop 54. Now if the second oscillator 51 is energized then its count-clock signal is delivered by means of the gated AND-circuit 57 to the up/down-counter 55 and this counter 55 begins to count upwards from the counter state null. If the total error $S'_{PT}$ contained in the counter 50 is smaller than the half wave-counter value $S'_{\lambda/2}$ set at the digital comparator 53, then the oscillator 51 is turned-off by the counter 50 when there has been counted by the up/down-counter 55 the total error $S'_{PT}$. The output connection or terminal $A_3$ which is connected with the up/down-counter 55 then carries the digital "correction-value signal" $\Delta P$ represented by the total error $S'_{PT}$ and the output terminal $A_1$ carries the "deceleration-signal". When the total error $S'_{PT}$ is greater than the half wave-counter value $S'_{\lambda/2}$, then initially the up/down-counter 55 counts upwards until its counter state has reached the half wave-counter value $S'_{\lambda/2}$ which has been set at the digital comparator 53. At this moment the digital comparator 53 flips-over the flip-flop 54, so that by means of its outputs 54a and 54b the AND-gate or circuit 56 is blocked and the AND-gate or circuit 57 is gated. The now following counter-clock signals of the oscillator 51 are counted downwards by the up/down-counter 55 and as soon as the oscillator 51 has been turned-off the counter state contained in the counter 55 $(S'_\lambda - S'_{PT})$ designates the "correction-value signal" $\Delta P$ (output or terminal $A_3$) and the output connection $A_2$ carries the direction signal "acceleration".

Figure 5:
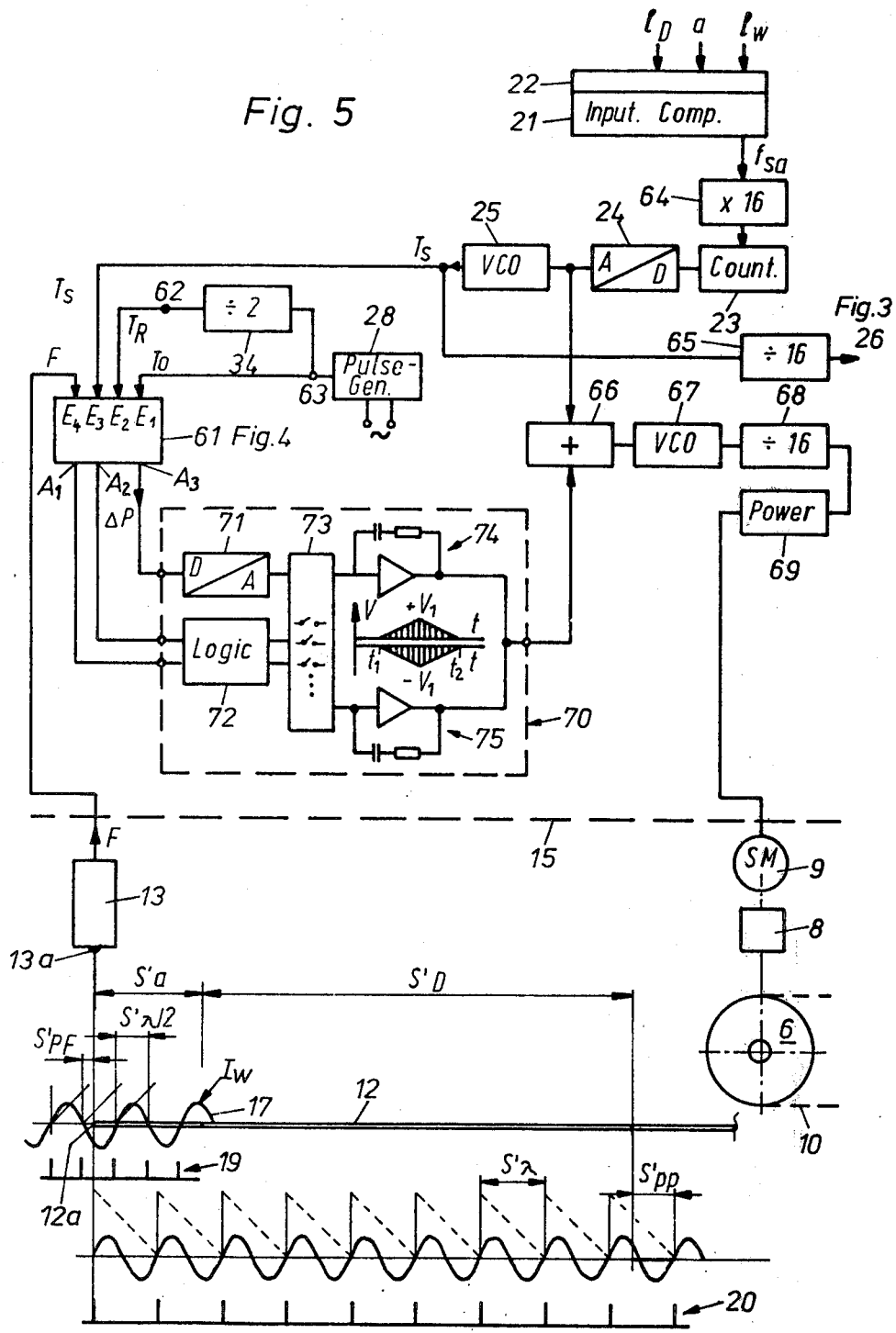
FIG. 5 is a block circuit diagram showing further details of the control for the roll-welding machine.

FIG. 5 schematically shows the situation at the moment of release of the trigger signal F. The leading edge 12a of the blank 12 has just reached the light beam emitted by the feeler device 13a of the edge detector 13 and there have been recorded the phase error $S'_{PF}$ as well as the position error $S'_{PP}$. Further, FIG. 5 illustrates in block circuit diagram the manner in which the feed control of FIG. 4 can be employed with the welding control of FIG. 3. The computer 21, FIG. 3, delivers in the manner previously described, the counter value for the drive-pulse frequency $f_{Sa}$, which, in order to obtain the stepping-clock signal $T_S$ (FIG. 4), is multiplied in a multiplier circuit or multiplier 64 with the selected factor, in the embodiment described amounting for instance to "16". By means of the obtained numerical value the counter 23 (FIG. 3) is set. The digital-analog converter (D/A-converter) 24 connected with the counter 23, applies a correspondingly high analog control voltage or potential to the voltage controlled oscillator (VCO) 25, which then produces the stepping-clock signal $T_S$ at the frequency $f_{T_S} = 16 f_{Sa}$. The stepping-clock signal $T_S$ is applied to the input $E_3$ of the feed control (FIG. 4), shown collectively by the block 61 in FIG. 5 to simplify the illustration, and is delivered by means of a frequency divider 65 (scaler factor "16") for driving the welding roll-drive motor 4 (FIG. 3) to the power circuit or component 26. The analog control signal of the D/A-converter 24 (FIG. 5) is applied to a summation circuit 66 at which there are connected in series a voltage controlled oscillator (VCO) 67, a frequency divider 68 (scaler factor "16"), a power component or circuit 69 and the sprocket wheel or gear-drive motor 9. The welding signal 19 produced by the pulse transmitter 28 (FIG. 3), and which possesses for instance a needle pulse for each null through-pass of the welding current $I_W$, is tapped-off of the connection or terminal point 63 and applied as the null-clock signal $T_O$ (FIG. 5) to the input $E_1$ of the feed control 61. At the connection terminal or node 62 (FIG. 3) at the output 34a of the frequency divider 34 there is tapped-off the reference signal 20 and applied as the cycle-clock signal $T_R$ to the input $E_2$ of the feed control 61 (FIG. 5). The input $E_4$ of the feed control 61 is connected with the edge detector 13 and receives therefrom the trigger signal F. Both of the outputs $A_1$ and $A_2$ of the feed control 61, as previously described, deliver the direction signal and the output $A_3$ delivers the correction-value signal $\Delta P$ in digital form. These signals are evaluated in a standard regulation circuit 70. Such regulation circuitry is well known in the positioning art for instance for machine tools. The regulation circuit 70 contains essentially a D/A-converter 71, which converts the digital correction signal ΔP into a corresponding analog voltage, an electronic switch 73 which is set by means of a logic circuit 72 by the direction signals of the outputs $A_1$ and $A_2$ in such a manner that for an incipient acceleration of the sprocket gear-drive the analog correction signal is applied to a first integrator 74 and for an incipient deceleration of the motor to a second integrator 75. Both of the integrators 74 and 75 are connected with the summation circuit or adder 66 and are operated to achieve a high regulation accuracy by timing-clock signals from a not particularly illustrated but standard quartz-clock generator.

The requisite correction of the feed time, during which the blanks, from the start of occurrence of the trigger signal F are moved through the measuring or measurement path D, with a shortening of the feed time (acceleration) corresponds to a reduction and upon prolongation of the feed time (deceleration) corresponds to an increase of the measuring path D by a number of steps or stepping-clock pulses $T_S$, which number is defined by the correction signal ΔP (digital), and must be properly completed prior to the blank reaching the welding rolls 1 and 2, since the blank must move into the gap between the welding rolls at the normal velocity or speed. Hence, for the correction there is used a fraction, for instance one-third, of the measuring path D. The time point $t_1$, when the correction starts, can be fixed by means of for instance a not particularly illustrated counter which is triggered by the trigger signal F and counts a predetermined number of stepping-clock signals $T_S$ and then triggers the regulation circuit or regulator 70. Up to the time point $t_1$ both of the integrators 74 and 75 thus deliver the voltage peak null. With a shortening of the feed time (acceleration) the integrator 74, starting from the time $t_1$, delivers a monotone ascending output voltage which, at the time point $(t_2-t_1)/2$ reaches the maximum value $+V_1$. From this point in time the output voltage again descends in monotone fashion and reaches at the time point $t_2$ the starting value null. The area of the triangle $t_1-V_1-t_2$ shown in the plotted velocity-time-graph represents the "saved" path of the blanks. Upon prolonging the feed time (deceleration) there is correspondingly delivered by the integrator 75, for instance a negative voltage. In the summation element or adder 66 the analog control voltage received by the D/A-converter 24 for the stepping-clock frequency $f_{T_S}$ (VCO 25) is changed by the output voltage of the regulation circuit 70, so that during the time span between $t_1$ and $t_2$ the frequency of the drive pulses for the stepping motor 9 and thus its velocity appropriately increases and decreases or decreases and increases, respectively. The blank thus properly enters between the welding rolls 1 and 2 and then at the moment of a null throughpass of the welding $I_W$ assumes the position shown in FIG. 3. In this position there is deposited the first weld spot. The seam is then completely welded, in the manner already discussed.

In the description hereinafter there will be referred to an exemplary embodiment of a feed control which need not be adjusted or set to a pre-given blank type (front spacing a, welding seam length $l_W$, end spacing b), rather it is possible for the welding machine to automatically complete the welding of a once begun welding seam of random length in such a manner that the last weld spot has the desired end or terminal spacing b from the trailing blank edge 12b and is produced by a welding current-half wave which has the opposite polarity as the welding current wave for the first weld spot.

The introduction of the blank 12 between the welding rolls 1 and 2 is accomplished in the previously discussed manner. The sprocket wheel-drive motor 9 is regulated by the circuit arrangement of FIG. 4. The sprocket wheel-motor 9 is driven by the drive pulses at the rated-frequency $f_{So}$. There is not accomplished any change to the work-pulse frequency $f_{Sa}$. Equally, the drive motor for the welding rolls during normal operation are exclusively operated at the rated-pulse frequency $f_{So}$.

Figure 6:
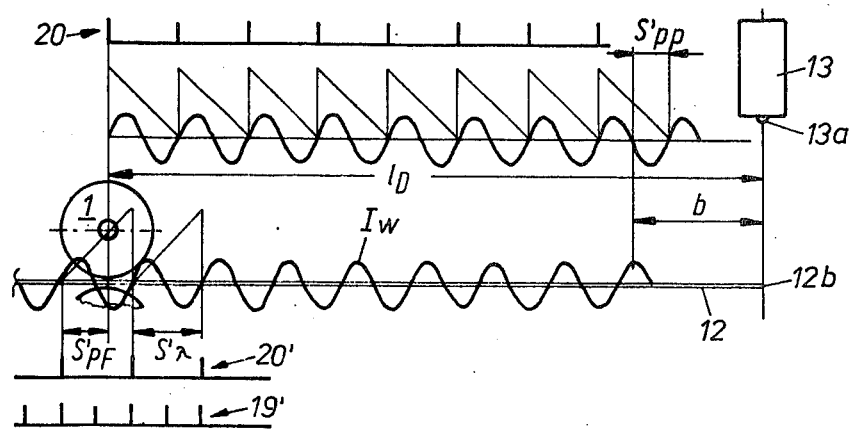
FIG. 6 schematic view and illustrates the welding rolls, the edge detector and the blank at the moment when the trailing blank edge has just moved past the associated feeler element of a modified arrangement.

FIG. 6 schematically illustrates the welding rolls 1 and 2, the edge detector 13 and the blank or workpiece 12 at that moment in time when the trailing blank edge 12b has just freed the feeler element 13a i.e. the light beam transmitted thereby. The edge detector 13 then delivers an appropriate signal F', for instance in the form of a negative going pulse flank. From the moment of time of occurrence of this trigger signal F' it is therefore necessary to still weld the welding seam piece $(l_D-b)$, wherein $l_D$ = length of the measuring path D, and b = end spacing of the last weld spot.

At the moment of the occurrence of the signal F' the welding current $I_W$ has a phase $S'_{PF}$ (phase error) and when the last weld spot has been deposited at the spacing b from the trailing edge 12b, then the welding current $I_W$ must have the phase 360° or null. Since this generally is not the case, the welding roll-drive motor 4 is appropriately regulated. It should be understood that for this purpose there can be used a circuit arrangement which essentially is identical to that shown and previously discussed in conjunction with FIG. 4.

Figure 7:
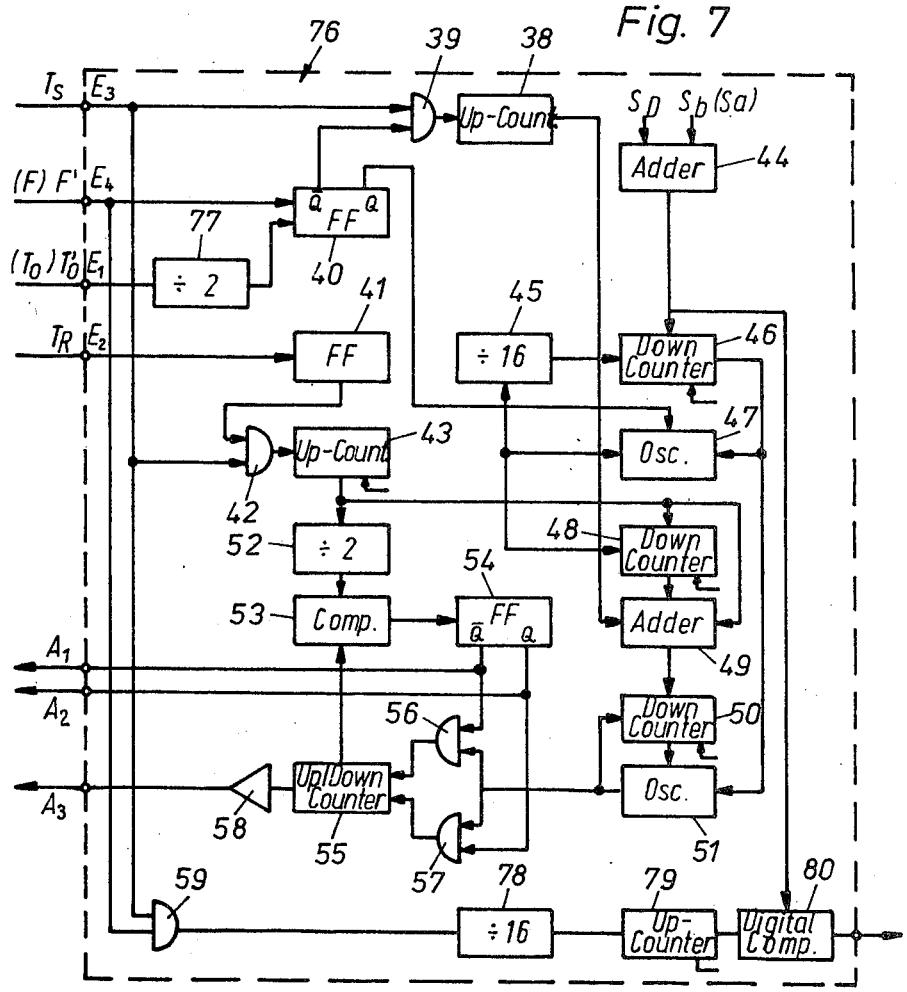
FIG. 7 is a block circuit diagram of circuitry for controlling the welding roll-drive motor and the sprocket wheel-drive motor of a modified roll-welding machine arrangement.

FIG. 7 illustrates a block circuit diagram for both of the circuit arrangements for controlling the welding roll-drive motor 4 and the sprocket wheel-drive motor 9, wherein the circuit components which are identical with those of the circuit arrangement of FIG. 4, have been conveniently designated by the same reference characters. The circuit arrangement for the sprocket wheel-drive motor 9 responds to the trigger signal F (e.g. positive going pulse flank) and the circuit arrangement for the welding roll-drive motor 4 responds to the trigger signal F' (negative going pulse flank). With the circuit arrangement for the sprocket wheel-motor 9 there is infed to the adder circuit or adder 44 by means of the multi-switch inputs the counter values $S_D$ (for the measuring path D) and $S_a$ (for the front spacing a) and there is obtained therefrom the setting-counter value $(S_D+S_a)$. For the circuit arrangement for the welding roll-motor 4 there are infed the counter values $S_D$ and $S_b$ (for the end spacing b) and there is received from the adder circuit 44 the setting-counter value $(S_D-S_b)$. In FIG. 7 there have been set in parenthesis the values $(S_a, F, T_o)$ which are used in the circuit arrangement for the sprocket wheel-drive motor. Each circuit arrangement or circuitry contains a digital comparator 80 which is set by the adder circuit 44 to the counter state or value $(S_D+S_a)$ and the counter value $(S_D-S_b)$. Connected with the digital comparator 80 is an upward or up counter 79 which receives by means of a frequency divider 78 (scaler factor "16") and by means of the AND-gate 59 from the input $E_3$ the stepping-clock signal $T_S$. The AND-gate 59 is gated by means of the trigger signal F or F', respectively, so that the counter, upon occurrence thereof, begins to count the pulses of the stepping-clock signal $T_S$, and when it has reached the counter state or value $(S_D+S_a)$ or $(S_D-S_b)$ set at the digital comparator 80, this digital comparator 80 delivers a signal which in the case of the circuit arrangement for the sprocket wheel-motor constitutes the welding-start signal and in the case of the circuit arrangement for the welding roll-motor constitutes the welding-stop signal. Both of these signals are infed to the phase control circuit 27.

Whereas, as has been described previously for the circuit arrangement of FIG. 4, the phase error $S'_{PF}$ can be related to a welding current-half wave (null-clock signal $T_O$), with the circuit arrangement for the welding roll-motor the phase error $S'_{PF}$ (FIG. 6) must be determined in relation to a full cycle of the welding current $I_W$, since the welding seam must encompass an even number of weld spots or a whole number of weld spot-pairs (full waves of the welding current $I_W$). At the input $E_1$ of the circuit arrangement for the welding roll-motor there are thus applied the pulses occuring with the welding-start signal, i.e., the pulses of the welding signal (null-clock signal $T'_O$) effective for welding and from the input $E_1$ this null-clock signal $T'_O$ is delivered by a frequency divider 77 (scaling factor "2") to the flip-flop 40. The frequency divider 77 can be integrated into the phase control circuit. In the circuit arrangement for the sprocket wheel-motor the phase error $S'_{PF}$ can be related to the welding current-half wave with a null-clock signal $T_O$ via the input $E_1$ at the flip-flop 40 or also to the full cycle of the welding current with a frequency-halved $T_O$-signal (= reference signal) at the flip-flop 40.

During operation each blank 12 initially is advanced at the contemplated feed speed by the conveyor chain 10 or equivalent structure, and both motors 4 and 9 are operated at the drive-pulse frequency $f_{So}$. When the leading edge 12a of the blank 12 has reached the feeler element 13a (light beam), the trigger signal F activates the circuit arrangement for the sprocket wheel-motor 9 and the rotational speed (drive-pulse frequency $f_{So}$) of this motor 9 is changed such that the location for the first weld spot which is positioned at a spacing a from the leading blank edge 12a arrives exactly during a null through-pass of the welding current at the welding location A of the welding rolls 1, 2 and at this moment there is also activated the phase control circuit by means of the welding-start signal delivered by such circuit arrangement, so that there can begin the welding of the seam. Until the trailing edge 12b of the blank 12 has reached the feeler element 13a the welding roll-drive motor 4 rotates at the drive-pulse frequency $f_{So}$. When there appears the trigger signal F', then the circuit arrangement for the welding roll-motor 4 is activated and the blank 12 is moved further by the welding roll 1 such that the location for the last weld spot which is disposed at a spacing b from the trailing blank edge passes the welding roll-pair 1, 2 during a welding current-half wave which has the opposite polarity from that of the welding current-half wave used for the formation of the first weld spot. Moreover, by means of the welding-stop signal delivered by such circuit arrangement there is blocked the phase control circuit. With the next successively incoming blank the same operations are repeated.

The previously not discussed details of the circuit arrangements, such as synchronization, control of the individual blocks with clock signals, extinguishing the different counters (e.g. 43,45,46,49,79, FIG. 7), construction of the blocks and their connection by interface-circuit components and so forth, are well within the skill of those versed in the art and therefore need not here be further considered since the same do not constitute specific teachings of the present invention.

FIG. 8 illustrates a block circuit diagram for the entire feed-control device with circuit arrangements according to FIG. 7. For the sprocket wheel-drive motor 9 there is provided a first circuit arrangement 76a (a first "computer") of FIG. 7 and a first regulation circuit 81a of conventional design and for the welding roll-drive motor 4 a second circuit arrangement 76b (a second "computer") according to FIG. 7 as well as a second regulation circuit 81b. Each regulation circuit or regulator 81a, 81b is connected by means of an interface-circuit component and a power part or circuit 82a and 82b (amplifiers) with the relevant motor 4 and 9 respectively and delivers thereto the drive pulses. With the regulation circuits 81a and 81b the feed velocity (rated-pulse frequency $f_{So}$) can be adjusted by means of a potentiometer 83. At the computers 76a, 76b there is again applied by means of the interface the trigger signal of the edge detector 13, and the computer 76a responds to the ascending flank of the trigger signal and the computer 76b to the descending signal flank. If the measuring path D is constant, then its numerical value $S_D$ can be fixedly stored in each computer 76a and 76b. If the measuring path D is adjustable, then a multi-switch can be provided for the infeed of the numerical value $S_D$ into each of both computers 76a and 76b. In any event each of the computers 76a and 76b is equipped with a multi-position switch or multi-switch 84a and 84b, respectively, for the infeed of the numerical values for the variable spacings a and b. Both of the computers 76a and 76b are connected by means of the interface with a firing-control circuit 86 of the phase control circuit 27. By means of the interface there are connected with the ignition or firing-control circuit 86 a potentiometer 85 for adjusting the desired welding capacity, a thyristor arrangement or circuit 87 which receives the firing or ignition pulses of the firing-control circuit 86 for the thyristors connected with the power supply network, and additionally there is infed the network voltage to the firing-control circuit 86 in order to synchronize the reference signals and so forth generated by it. At the thyristor arrangement or circuit 87 there is connected the primary winding 14a of the welding transformer 14, the secondary winding 14b of which is connected with the welding rolls 1 and 2 (FIG. 1). The firing or ignition-control circuit 86 delivers to the computers 76a and 76b the null-clock signal $T_O$ and $T'_O$, respectively, and receives therefrom the welding-start signal and the welding-stop signal, respectively. Each computer 76a and 76b delivers to the therewith associated regulation circuit 81a and 81b, respectively, the correction signal $\Delta P$ and the direction signal and receives therefrom the digital signal for the drive-pulse frequency $f_{So}$ determined by the selected feed velocity (potentiometer 83).

While there are shown and described present preferred embodiments of the invention, it is to be distinctly understood that the invention is not limited thereto, but may be otherwise variously embodied and practiced within the scope of the following claims. Accordingly,

What we claim is:

1. A method of controlling the beginning of welding and the end of welding during continuous resistance welding by means of an alternating-current at a roll-welding machine, comprising the steps of: providing a welding station for the resistance welding of workpieces moving in a predetermined direction of travel to said welding station, determining at least at one measuring station arranged ahead of the welding station and through which pass the workpieces to be welded the position of a leading end and a trailing end of a workpiece to be welded as a function of time with respect to the frequency and phase of the welding current, deriving thereby a measurement value, processing the measurement value in order to accommodate the speed of travel of the workpiece to be welded and the frequency and phase of the welding current to one another in such a manner that the first weld spot and the last weld spot is applied at an adjustable spacing from the leading end and the trailing end, respectively, of the workpiece to be welded.

2. The method as defined in claim 1, especially for controlling the workpiece-feed of the roll-welding machine with constant frequency of the welding current, further comprising the steps of: feeding the workpieces to the welding station by means of a transport mechanism equipped with a drive motor, providing for the welding station welding rollers, wherein at least one of the welding rollers is driven by a drive motor, and regulating the speed of the drive motor of the transport mechanism delivering the workpiece to the welding rollers in such a manner that the first weld spot is applied at an adjustable spacing from the leading end of the workpiece, and regulating the speed of the drive motor of the one welding roller in such a manner that the last welding spot is applied at an adjustable spacing from the trailing end of the workpiece.

3. A method of controlling the start of welding and the end of welding during continuous resistance welding by means of an alternating-current at a roll-welding machine, comprising the steps of: providing a welding station for welding workpieces by means of a welding current, providing at least one measuring station arranged ahead of the welding station and through which pass the workpieces to be welded and which workpieces move in a predetermined direction of travel, determining at said measuring station the position of the leading end and the trailing end of a workpiece to be welded as a function of time with respect to the frequency and phase of the welding current, deriving from such determination a measurement value, and processing the measurement value such as to accommodate the speed of travel of the workpiece to be welded and the frequency and phase of the welding current to one another in such a manner that the first weld spot and the last weld spot is respectively deposited at an adjustable spacing from the leading end and trailing end of the workpiece to be welded.

4. A method of resistance seam welding successive workpieces by means of an alternating welding current of constant frequency at a roll-welding machine feeding successive workpieces along a path of travel defining a direction of transport of the workpieces into a welding station including a welding gap between a pair of welding rollers and producing on each workpiece to be welded during its advance by applying to the workpiece a burst of a whole number of full cycles of the alternating welding current a series of weld spots, each weld spot being produced during a successive half cycle of the burst of alternating welding current, comprising the steps of:

transporting each workpiece to and through the welding station at a nominally constant speed;

detecting the first instant in time at which a leading edge of a workpiece passes at said nominally constant speed through a measurement station disposed at a given reference distance in advance of the welding gap of said welding station in the direction of transport of the workpieces;

determining a first value of the phase of the alternating welding current at said first instant of time;

evaluating a first reference phase value from the frequency of the welding current, the value of said nominally constant speed and the length of a first feed distance plus an arbitrary front distance so that with said first reference phase value at said first instant of time the welding current would have a zero pause at the end of the time interval required for advancing the workpiece by said first feed distance at said nominally constant speed;

altering the speed of transport of the workpiece during advance from said measurement station to the welding station in accordance with a first deviation of said determined first phase value from said first reference phase value to ensure that the series of weld spots are so disposed on the workpiece that the leading end of the first weld spot in the series is spaced inwardly of the leading edge of the workpiece by said front distance;

detecting the second instant in time at which a trailing edge of the workpiece passes at said nominally constant speed through said measuring station;

determining a second value of the phase of the alternating welding current at said second instant of time;

evaluating a second reference phase value from the frequency of the welding current, said nominally constant speed and a second feed distance consisting of the difference of said reference distance minus an arbitrary rear distance so that with said second reference value at said second instant of time the welding current would have a zero pause at the end of the time interval required for advancing the workpiece by said second feed distance at said nominally constant speed; and altering the speed of transport of the workpiece during its advance to said welding station in accordance with a second deviation of said second determined phase value from said second reference phase value to ensure that the series of weld spots are so disposed on the workpiece that the trailing end of the last weld spot in the series is spaced inwardly of the trailing edge of the workpiece by said rear distance.

5. The method as defined in claim 4, further comprising the steps of:

feeding the workpieces to the welding station by means of a transport mechanism equipped with a first electric motor;

providing for the drive of at least one of the welding rollers a second electric motor;

driving said first and said second motor by a first and a second driving pulse train, respectively, and producing with each driving pulse applied to said first and said second motor an advance of the workpiece by one increment of way of the same constant minimal length, the speed of the workpiece advanced by said first and said second motor being determined by the frequency of said first and said second driving pulse train;

altering the speed of transport of the workpiece during advance from the measurement station to the welding rollers by altering the frequency of said first driving pulse train in accordance with the first deviation of the determined first phase value from first reference phase value; and altering the speed of transport of the workpiece during advance through said welding station by altering the frequency of said second driving pulse train in accordance with the second deviation of the determined second phase value from second reference phase value.

6. The method as defined in claim 5, further including the steps of:
using as the electric motors digital motors.

7. The method as defined in claim 5, further including the steps of:
using as the electric motors stepping motors.

8. The method as defined in claim 5, wherein:
the determination of the first and the second phase value is performed by counting the driving pulses of the first and the second driving pulse train of nominally constant frequency corresponding to the nominally constant speed of the workpieces for each of the successive half or full cycles of the welding current starting with a zero pause of the welding current and stopping the count at the first instant in time at which the leading edge of the workpiece passes through the measurement station and at the second instant in time at which the trailing edge of the workpiece passes through the measurement station, respectively;

basing the evaluation of the first and the second reference phase value on a reference distance between the welding gap and the measurement station having a predetermined number of increments of way;

performing such evaluation by converting the lengths of the front distance, the rear distance, the first and the second feed distances in corresponding numbers of said increments of way;

determining the number of said increments of way for the half or full cycle of the welding current, with the aid of the constant frequency of the welding current and the nominally constant frequency of the first and the second driving pulse train;

using said increment numbers of the first and the second feed distance and said increment number of the half or full cycle welding current in a restoring division, and obtaining the number of increments of the first and second reference phase value; and deviations obtained by comparison of the first phase value with the first reference phase value and of the second phase value with the second reference phase value giving the numbers of increments of way by which the workpiece at its advance from the measurement station to the welding station and through the welding station, respectively, has to be accelerated or decelerated to arrive at the welding gap at the right instant of time for setting the first and the last weld spot on the accurate place.

9. The method as defined in claim 8, wherein:
acceleration or deceleration during the advance of the workpiece from the measurement station to the welding station according to the first deviation of phase and during the advance of the workpiece through the welding station according to the second deviation of phase is performed by altering the frequency of the first driving pulse train and the second driving pulse train, respectively, from the normally constant frequency value to a higher respectively a lower frequency value and from said higher respectively said lower frequency value to said normally constant frequency value to ensure that the workpiece runs in between said pair of welding rollers and runs out of the pair of welding rollers at the normally constant speed of transport.

10. A method of resistance seam welding successive workpieces of predetermined length by means of an alternating welding current of constant frequency at a roll-welding machine operable to feed successive workpieces at a nominally constant rated speed along a straight path into and through a welding station including a welding gap between a pair of welding rollers and producing on each workpiece to be welded during its advance through the welding station by applying to the workpiece a burst of a whole number of full cycles of the alternating welding current a series of weld spots, each weld spot being produced during a successive half cycle of the burst of alternating welding current, the leading end of the first weld spot in the series being spaced inwardly of the leading edge of the workpiece by a predetermined front distance and the trailing end of the last weld spot in the series being spaced inwardly of the trailing edge of the workpiece by a predetermined rear distance, comprising the steps of:

modifying the nominally constant rated speed in a nominally constant working speed at which the length of the weld seam given by the length of the workpiece to be welded diminished by the predetermined front distance and the predetermined rear distance comprises exactly a whole number of full cycles of the alternating welding current of constant frequency and transporting the workpiece to be welded to and through the welding station at said nominally constant working speed;

detecting the instant in time at which the leading edge of the workpiece to be welded pass at said nominally constant working speed through a measurement station disposed at a given reference distance in advance of the welding station in direction of transport of the workpieces;

determining the value of the phase of the alternating welding current at said instant of time;

evaluating a reference phase value from the frequency value of the welding current, the value of said nominally constant working speed and the length of a feed distance consisting of the sum of said reference distance plus said front distance so that with said reference phase value at said instant of time the welding current would have a zero pause at the end of the time interval required for advancing the workpiece by said feed distance at said nominally constant working speed;

altering the working speed of transport of the workpiece during advance from said measurement station to the welding station in accordance with the deviation of said determined phase value from reference phase value to ensure that the series of weld spots are so disposed on the workpiece that the leading end of the first weld spot in the series is spaced inwardly of the leading edge of the workpiece by said front distance;

counting the full cycles of the welding current applied to the workpiece; and interrupting the application of the welding current to the workpiece when the number of full cycles for the length of the weld seam is counted off.

11. The method as defined in claim 10, further comprising the steps of:
feeding the workpieces to the welding station by means of a transport mechanism equipped with a first electric motor;
providing for the drive of at least one of the welding rollers a second electric motor;
driving said first and said second motor by a first and a second driving pulse train, respectively, and producing with each driving pulse applied to said first and said second motor an advance of the workpiece by one increment of way of the same constant minimal length, the nominally constant frequency of said first and said second driving pulse train being determined by the nominally constant working speed of the workpiece advanced by said first and said second motor; and
altering the speed of transport of the workpiece during its advance from the measurement station to the welding station by altering the nominally constant frequency of said first driving pulse train in accordance with the deviation of the determined phase value from the reference phase value.

12. The method as defined in claim 11, wherein:
the determination of the phase value is performed by counting the driving pulses of the first driving pulse train of nominally constant frequency corresponding to the nominally constant working speed of the workpieces for each of the successive half or full cycles of the welding current starting with a zero pause of the welding current and stopping the count at the instant in time at which the leading edge of the workpiece passes through the measurement station;
basing the evaluation of the reference phase value on a reference distance having a predetermined number of increments of way;
performing such evaluation by converting the lengths of the front distance and the feed distance in corresponding numbers of increments of way;
determining the number of increments of way for the half or full cycle of the welding current with the aid of the constant frequency of the welding current and the nominally constant frequency of the first driving pulse train;
using said increment number of the half or full cycle of welding current and the increment number of the feed distance in a restoring division obtaining the number of increments of the reference phase value; and
any deviation obtained by comparison of the phase value in increments and the reference phase value in increments giving the number of increments of way by which the workpiece at its advance from the measurement station to the welding station has to be accelerated or decelerated to arrive at the welding gap at the right instant of time for setting the first weld spot on the accurate place.

13. The method as defined in claim 12, wherein:
acceleration or deceleration during the advance of the workpiece from the measurement station to the welding station according to the deviation of phase is performed by altering the frequency of the first driving pulse train from the normally constant frequency value to a higher respectively a lower frequency value and from said higher respectively said lower frequency value to said normally constant frequency value to ensure that the workpiece runs in between the pair of welding rollers at the normally constant working speed of transport.

14. An apparatus for controlling the start of welding and the end of welding during continuous resistance welding by means of an alternating current at a roll-welding machine, comprising:
means defining a welding station through which pass in a predetermined direction of travel the workpieces to be welded by a welding current;
means defining a measuring station arranged forwardly of the welding station and through which pass the workpieces to be welded;
said means defining said measuring station incorporating means for determining the position of the leading end and the trailing end as a function of time with respect to the frequency and phase of the welding current;
means operatively connected with said determining means for accommodating the speed of movement of the workpieces to be welded and the frequency and phase of the welding current to one another in such a manner that the first weld spot and the last weld spot are applied in each instance at an adjustable spacing from the leading end and the trailing end, respectively, of each workpiece to be welded.

15. The apparatus as defined in claim 14, especially for controlling the workpiece-feed of a roll-welding machine with constant frequency of the welding current, wherein:
said means defining the welding station comprises a pair of welding rollers;
one of the welding rollers being provided with drive means;
a transport mechanism for feeding the workpieces in the direction of the welding station;
said transport mechanism being provided with drive means;
said transport mechanism including conveying elements for the workpieces, said transport mechanism being drivable by its drive means independently of the drive means for the welding rollers of the welding station in order to feed a workpiece to be welded to the welding rollers by means of the conveying elements;
said conveying elements of the transport mechanism being in operative engagement with the respective workpiece engaged thereby until transfer of each such workpiece to the welding rollers;
said means for determining the position of the leading end and the trailing end of the workpiece as a function of time with respect to the frequency and phase of the welding current is arranged between a conveying end point of the transport mechanism and the welding rollers and is operatively connected with said accommodating means;
means for operatively connecting said accommodating means with the drive means of the transport mechanism in order to regulate the speed thereof in such a manner that the first weld spot is always applied at an adjustable spacing from the leading end of the workpiece; and
means connecting the accommodating means with the drive means of the welding rollers in order to regulate the speed thereof in such a manner that the last weld spot is always applied at an adjustable spacing from the trailing end of the workpiece.

16. The apparatus as defined in claim 15, wherein:
the drive means of the transport mechansim and the drive means for the one welding roller of the welding station each comprise a drive motor.

17. The apparatus as defined in claim 15, wherein:
said means arranged in the measuring station between the conveying end point of the transport mechanism and the welding rollers comprises light barrier means.

18. The apparatus as defined in claim 15, wherein:
said drive means of the welding rollers and the drive means of the transport mechanism each comprise an electronically controlled regulating- or stepping motor.

19. An apparatus for resistance seam welding successive workpieces, comprising:
a roll-welding station having a pair of welding rollers electrically connected to a welding transformer fed via phase control means with alternating welding current of constant frequency;
first transport means to transport the workpieces in a predetermined direction and at a nominally constant speed to the roll-welding station;
second transport means to transport the workpieces in said direction and at said nominally constant speed through said roll-welding station;
a measurement station including an electric edge detector disposed at a predetermined reference distance in advance of the welding station in the direction of transport of workpieces and operative to generate different electric edge signals in the instants of time at which a leading edge and a trailing edge of the workpiece to be welded pass therethrough;
first computer means;
said first computer means including:
first phase determining means connected to the measurement station for receiving said leading edge signal and operative to determine the value of the phase of the alternating welding durrent at the moment of occurrence of said leading edge signal and to generate a corresponding first phase signal;
first reference phase evaluating means having data inputs for reading in the length value of a first feed distance consisting of the sum of the length value of said reference distance plus the length value of a front distance which for each workpiece to be welded indicates a predetermined distance of a leading end of the weld seam from the leading edge of the workpiece;
processor means operative to evaluate a first reference phase value from the length value of the first feed distance, the frequency value of the welding current and the value of the nominally constant speed by restoring division said first feed distance by the half or full cycle length value of the welding current related to the nominally constant speed, and to generate a corresponding first reference phase signal;
first phase comparator means operative to receive said first phase signal and said first reference phase signal and to produce therefrom a first deviation signal indicating a length error of the first feed distance;
first speed control means connected to said first computer means for receiving said first deviation signal and operatively connected with said first transport means to regulate the rate of feed of the workpiece in accordance with said first deviation signal to ensure that the welding current has a zero pause when the leading edge of the workpiece is advanced by said first feed distance;
second computer means;
said second computer means including:
second phase determining means connected to the measurement station for receiving said trailing edge signal and operative to determine the value of the phase of the alternating welding current at the moment of occurrence of said trailing edge signal and to generate a corresponding second phase signal;
second reference phase evaluating means having data inputs for reading in the length value of a second feed distance consisting of the difference of the length value of said reference distance minus the length value of a rear distance which for each workpiece to be welded indicates a predetermined distance of the trailing end of the weld seam from the trailing edge of the workpiece;
processor means operative to evaluate a second reference phase value by restoring division of the length value of said second feed distance by the half or full cycle length value of the welding current related to the nominally constant speed and to generate a corresponding second reference signal;
second phase comparator means operative to to receive said second phase signal and said second reference phase signal and to produce therefrom a second deviation signal indicating a length error of the second feed distance;
second speed control means connected to said second computer means for receiving said second deviation signal and operatively connected with said second transport means to regulate the rate of passage of the workpiece through the welding station in accordance with said second deviation signal to ensure that the welding current has a zero pause when the trailing edge of the workpiece is advanced by said second feed distance;
welding start signal generator means included in said first computer means and operative to generate a welding start signal when the leading edge of the workpiece is advanced from the measurement station by said first feed distance;
welding stop signal generator means included in said second computer means and operative to generate a welding stop signal when the trailing edge of the workpiece is advanced from the measurement station by said second feed distance; and
welding control means connected to said first and second computer means to receive said welding start signal and said welding stop signal, respectively, and operatively connected to the phase control means of the roll-welding station to trigger said phase control means in accordance with said welding start signal and said welding stop signal to apply via said welding rollers to the workpiece a burst of a whole number of full cycles of the alternating welding current producing a series of weld spots, each weld spot being produced during a successive half cycle of the burst of alternating welding current and thereby ensuring that the leading end of the first weld spot in the series is spaced inwardly of the leading edge of the workpiece by said predetermined front distance and the trailing end of the last weld spot in the series is spaced inwardly of the trailing edge of the workpiece by said predetermined rear distance.

20. The apparatus as defined in claim 19, wherein:

the first transport means include a first electric motor drivable by a first drive pulse train;

first drive means operable by said first motor to advance the workpiece along the transport path with each drive pulse applied to the first motor by one increment of way of the same constant minimal length;

first motor control means having incorporated first drive pulse generator means connected to said first motor;

said first motor control means being adjustable to generate said drive pulse at a nominally constant frequency corresponding to the nominally constant speed and being controllable by the first speed control means to alter the nominally constant drive pulse frequency;

said second transport means including a second electric motor drivable by a second drive pulse train;

second drive means having incorporated at least one of the pair of welding rollers and operable by said second motor to advance the workpiece with each drive pulse applied to the second motor by said one increment of way;

second motor control means having incorporated second drive pulse generator means connected to said second motor;

said second motor control means being adjustable to generate said second drive pulses at a nominally constant frequency corresponding to the nominally constant speed and being controllable by the second speed control means to alter the nominally constant drive pulse frequency;

the measurement station including the electric edge detector is disposed at a reference distance consisting of a predetermined number of said increments of way;

the first and the second computer means including the first and second phase determining means;

the first and the second reference phase evaluating means and the first and second phase comparator means, respectively, have digital data inputs for reading in the length values of the reference distance and the front distance and of the reference distance and the rear distance, respectively, as corresponding numbers of increments of way and being operative to process the digital data and to generate a first and a second digital deviation signal, respectively; and the first and second speed control means being capable of processing said first and said second digital deviation signal, respectively.

21. The apparatus as defined in claim 20, further including:

timing pulse generator means settable to generate in accordance with a predetermined nominally constant speed timing pulses at a timing frequency which is a multiple of the nominally constant drive pulse frequency, each step of the first and second motor at nominally constant speed and the increment of way being determined by a unitary number of said timing pulses;

reference welding signal generator means controlled by the alternating welding current to generate a reference welding signal having at each zero pause of the welding current a steep pulse edge;

said first and second phase determining means each include first means receiving said timing pulses, said reference welding signal and the leading edge and trailing edge signal, respectively, and being operative to count up said timing pulses for each successive half cycle of the welding current and to stop said counting when said edge signal is received, said stopped count being the first and the second phase value, respectively;

the first and second reference phase evaluating means each include second means receiving said timing pulses and said reference welding signal and being operative to count up said timing pulses for each successive full cycle of the welding current;

first down-counter means presettable by means of data input means on a count value corresponding to the number of increments of way of the first feed distance being the sum of the reference distance plus the front distance and of the second feed distance being the difference of the reference distance minus the rear distance, respectively;

second down-counter means settable by said second up-counter means successively on the count for the number of timing pulses of the full cycle;

first down-counter driver means triggered by said edge signal and operative to count down in fast counting successively the set count values of the second down-counter means and the set count value of the first down-counter means and to interrupt down counting when the first down-counter means is count to zero, the stopped count of the second down-counter means being the first and the second reference phase value, respectively;

the first and second phase comparator means each include adder means connected to said first and second up-counter means and to the second down-counter means for reading-in the count values of the phase value, the reference phase value and the full cycle value and operative to evaluate therefrom a total error value;

third down-counter means presettable by said adder means on the total error value;

digital comparator means operatively connected with said second up-counter means via a frequency divider and being set on the half cycle count value and operatively connected to up/down-counter means having counting control means triggered by output signals of said digital comparator means in such a way that when the count of said up/down-counter means is below the half cycle count value said up/down-counter means are set for up-counting ingoing pulses and after reaching said half cycle count value said up/down-counter means are set for down-counting ingoing pulses;

said counting control means being operable to generate a binary direction signal in accordance to the up- and down-counting mode of said up/down-counter means, said binary direction signal determining acceleration and deceleration of the workpiece, respectively;

second down-counter driver means operatively connected to said first down-counter means and being triggered when the count of said first down-counter means reaches zero for stepping out the count value contained in the third down-counter means and to feed a corresponding number of pulses into said up/down-counter means in a fast mode, the count value of the up/down-counter means being the deviation amount; and the welding start signal generator means and the welding stop signal generator means each including third up-counter means operatively connected to receive said timing pulses and said edge signal and triggered by said leading edge signal and said trailing edge signal, respectively, to count increments of way, each increment being represented by said unitary number of timing pulses;

second digital comparator means settable by means of said data input means on said count value corresponding to the number of increments of way of the first and second feed distance, respectively, and operative to generate an output signal when the count value of the third up-counter means reaches said set count value, the output signal being the start signal and the stop signal, respectively, and being applied to the welding control means; and wherein the first and second speed control means are operatively connected with the first and second phase comparator means, respectively, to receive said binary direction signal and said deviation amount signal and being operative to generate therefrom a motor control signal applied to the first and the second motor control means, respectively.

22. The apparatus as defined in claim 21, wherein: said first and second means receiving said timing pulses comprises up-counter means.

23. The apparatus as defined in claim 21, wherein: said first and second means receiving said timing pulses comprises register means.

24. The apparatus as defined in claim 21, wherein: the first and second motor control means each include voltage controlled oscillator means and control voltage summing means having a first input for applying a control voltage at which the voltage controlled oscillator means generate drive pulses at the nominally constant frequency and a second input connected to the first and second speed control means, respectively.

25. The apparatus as defined in claim 24, wherein: the first and second speed control means each being operative to generate in accordance with the deviation signal including a binary direction signal for determining the direction, acceleration of deceleration, of the deviation and a digital amount signal determining the amount of the deviation an analog voltage signal increasing from a zero value for acceleration in positive direction and for deceleration in negative direction to a maximum value dependent of the value of the digital amount signal and decreasing from said maximum value to said zero value in a time interval which is shorter than the time interval for advancing the leading edge by the first feed distance and the trailing edge of the workpiece by said second feed distance, respectively, at normally constant speed.

26. The apparatus as defined in claim 25, wherein: the first and the second speed control means each include a D/A-converter connected to receive the digital amount signal;

logic circuit means connected to receive the binary direction signal;

electronic switch means having a first and a second output and operable to connect said D/A-converter with the first output at a first value of the binary direction signal and to connect said D/A-converter with the second output at a second value of the binary direction signal;

first and second integrator means connected to said first and second switch output, respectively, and being controlled by precision timing means;

said first and second integrator means having outputs connected commonly to the control voltage summing means.

27. An apparatus for resistance seam welding successive workpieces each of a measured length, on each welded workpiece the leading end of the weld seam being spaced inwardly of the leading edge of the workpiece by a predetermined front distance and the trailing end of the weld seam being spaced inwardly of the trailing edge of the workpiece by a predetermined rear distance, comprising:

a roll-welding station having a pair of welding rollers electrically connected to a welding transformer fed via phase control means with alternating welding current of constant frequency;

first transport means to transport the workpieces in a predetermined direction and at a nominally constant speed to the roll-welding station, said first transport means being adjustable to transport the workpiece to be welded at an evaluated nominally constant working speed at which the length of the weld seam given by the length of the workpiece diminished by the front distance and the rear distance predetermined for the workpiece comprises exactly a whole number of full cycles of the alternating welding current of constant frequency and being controllable by an electric control signal to accelerate and decelerate the transport of the workpieces;

second transport means to transport the workpieces in said predetermined direction and at said nominally constant speed through said roll-welding station, said second transport means being adjustable to transport the workpiece at said nominally constant working speed;

a measurement station including an electric edge detector disposed at a predetermined reference distance in advance of the welding station in the direction of transport of workpieces and arranged to generate an electric edge signal in the instant of time at which the leading edge of the workpiece to be welded pass therethrough;

computer means including:
phase determining means connected to the measurement station for receiving said edge signal and operative to determine the value of the phase of the alternating welding current at the moment of occurrence of said edge signal and to generate a corresponding phase signal;

reference phase evaluating means having data inputs for reading in the length value of a feed distance consisting of the sum of the length value of said reference distance plus the length value of the predetermined front distance;

processor means operative to evaluate a reference phase value from the length value of the feed distance, the frequency value of the welding current and the value of the nominally constant working speed by restoring division said feed distance by the half or full cycle length value of the welding current related to the nominally constant working speed and to generate a corresponding reference phase signal;

phase comparator means operative to receive said phase signal and said reference phase signal and to produce therefrom a deviation signal indicating a length error of the feed distance;

speed control means connected to said computer means for receiving said deviation signal and operatively connected with said first transport means to regulate the rate of feed of the workpiece in accordance with said deviation signal to ensure that the welding current has a zero pause when the leading edge of the workpiece is advanced by said feed distance;

welding start signal generator means included in said computer means and operative to generate a welding start signal when the leading edge of the workpiece is advanced by said feed distance;

welding stop signal generator means included in said computer means and having full cycle counter means presettable on said full cycle number of the weld seam and operative to be actuated by said start signal to count full cycles of the welding current and to generate a welding stop signal when said set full cycle number is counted; and welding control means connected to said computer means to receive said welding start signal and said welding stop signal and operatively connected to the phase control means of the roll-welding station to trigger said phase control means in accordance with said welding start and welding stop signal to apply via said welding rollers to the workpiece a burst of said whole number of full cycles of the alternating welding current producing a series of weld spots, each weld spot being produced during a successive half cycle of the burst of alternating welding current and thereby ensuring that the leading end of the first weld spot in the series is spaced inwardly of the leading edge of the workpiece by said predetermined front distance and the trailing end of the last weld spot in the series is spaced inwardly of the trailing edge of the workpiece by said predetermined rear distance.

28. The apparatus as defined in claim 27, wherein:

the first transport means include a first electric motor drivable by a first drive pulse train;

first drive means operable by said first motor to advance the workpiece along the transport path with each drive pulse applied to the first motor by one increment of way of the same constant minimal length;

first motor control means having incorporated first drive pulse generator means connected to said first motor;

said first motor control means being adjustable to generate said drive pulses at a nominally constant working frequency corresponding to the nominally constant working speed and being controllable by the speed control means to alter the nominally constant drive pulse frequency;

said second transport means including a second electric motor drivable by a second drive pulse train;

second drive means having incorporated at least one of the pair of welding rollers and operable by said second motor to advance the workpiece with each drive pulse applied to the second motor by said one increment of way;

second motor control means adjustable to generate said second drive pulses at a nominally constant working frequency corresponding to the nominally constant working speed;

said measurement station including the electric edge detector being disposed at a reference distance consisting of a predetermined number of said increments of way;

the computer means including the phase determining means, the preference phase evaluating means, the phase comparator means, welding start signal generator means and welding stop signal generator means have digital data inputs for reading in the length values of the reference distance, the front distance, the weld seam or the workpiece and the rear distance as corresponding numbers of increments of way and being operative to process the digital data and to generate a digital deviation signal; and the speed control means being capable of processing said digital deviation signal.

29. The apparatus as defined in claim 27, further including:

timing pulse generator means settable to generate in accordance with the evaluated nominally constant working speed timing pulses at a timing frequency which is a multiple of the nominally constant drive pulse working frequency, each step of the first and second motor at nominally constant working speed and the increment of way being determined by an unitary number of said timing pulses;

reference welding signal generator means controlled by the alternating welding current to generate a reference welding signal having at each zero pause of the welding current a steep pulse edge;

said phase determining means including first up-counter means receiving said timing pulses, said reference welding signal and the edge signal and being operative to count up said timing pulses for each successive half cycle of the welding current and to stop said counting when said edge signal is received, said stopped count being the phase value;

the reference phase evaluating means include second up-counter means receiving said timing pulses and said reference welding signal and being operative to count up said timing pulses for each successive full cycle of the welding current;

first down-counter means presettable by means of data input means on a count value corresponding to the number of increments of way of the feed distance being the sum of the reference distance plus the front distance;

second down-counter means settable by said second up-counter means successively on the count for the number of timing pulses of the full cycle;

first down-counter driver means triggered by said edge signal and operative to count down in a fast mode successively the set count values of the second down-counter means and the set count value of the first down-counter means and to interrupt down counting when the first down-counter means is count to zero, the stopped count of the second down-counter means being the reference phase value;

said phase comparator means including adder means connected to said first and second up-counter means and to the second down-counter means for reading in the count values of the phase value, the full cycle value and the reference phase value and operative to evaluate therefrom a total error value;

third down-counter means presettable by said adder means on the count of the total error value;

digital comparator means operatively connected with said second up-counter means via a frequency divider for being set on the half cycle count value and operatively connected to up/down-counter means having counting control means triggered by output signals of said digital comparator means in such a way that when the count of said up/down-counter means is below the half cycle count value said up/down-counter means are set for up-counting ingoing pulses and after reaching said half cycle count value said up/down-counter means are set for down-counting ingoing pulses;

said counting control means being operable to generate a binary direction signal in accordance to the up- and down-counting mode of said up/down-counter means, said binary direction signal determining acceleration and deceleration of the workpiece, respectively;

second down-counter driver means operatively connected to said first down-counter means for being triggered when the count of said first down-counter means reaches zero for stepping out the count value insert in the third down-counter means and to feed a corresponding number of pulses into said up/down-counter means in a fast mode, the count value of the up/down-counter means being the deviation amount;

said phase comparator means being operatively connected with the speed control means operative to generate from said binary direction signal and said digital deviation amount signal a motor control signal applied via the first motor control means to the first motor;

said timing pulse generator means, the edge detector and said reference welding signal generator being connected to the welding start and welding stop signal generator means producing a weld seam control signal applied to the phase control means of the welding station.

30. The apparatus as defined in claim 29, wherein:

the timing pulse generator means include a first voltage controlled oscillator connected to a first A/D-converter means for applying an analog control voltage to the voltage controlled oscillator;

said analog control voltage being determined by a digital count value of first counter means connected to the A/D-converter means;

said first counter means being settable by means of data entry means on a count value leading to an analog voltage value at which the first voltage controlled oscillator generates said timing pulses at the timing pulse frequency which is a multiple of the nominally constant drive pulse working frequency;

the first motor control means including a second voltage controlled oscillator;

a control voltage input of said second voltage controlled oscillator being connected via summing means with a control voltage input of the first voltage controlled oscillator to generate timing pulses at the timing pulse frequency which is a multiple of the nominally constant drive pulse working frequency and via said summing means with the output of the speed control means to alter the frequency of the timing pulses generated by the second voltage controlled oscillator according to the deviation signal;

frequency divider means connecting the output of the second voltage controlled oscillator with the first motor and reducing the frequency of the oscillator pulses by a reduction factor corresponding to said multiple; and the second motor control means including a second frequency divider connected between the output of the first voltage controlled oscillator and the second motor.

31. The apparatus as defined in claim 30, wherein:

said speed control means being operative to generate in accordance with the deviation signal consisting of a binary direction signal for determining the direction, acceleration or deceleration, of the deviation and a digital amount signal determining the amount of the deviation an analog voltage signal increasing from a zero value for acceleration in positive direction and for deceleration in negative direction to a maximum value dependent of the value of the digital amount signal and decreasing from said maximum value to said zero value in a time interval which is shorter than the time interval for advancing the leading edge by the feed distance at normally constant working speed.

32. The apparatus as defined in claim 31, wherein:

the speed control means includes a third D/A-converter connected to receive the digital amount signal;

logic circuit means connected to receive the binary direction signal;

electronic switch means having a first and a second output and operable to connect said third D/A-converter with the first output at a first value of the binary direction signal and to connect said third D/A-converter with the second output at a second value of the binary direction signal;

first and second integrator means connected to said first and said second switch output, respectively, and being controlled by precision timing means;

said first and second integrator means having outputs connected commonly to the control voltage summing means.

* * * * *